US012688809B2

(12) United States Patent
Hao et al.

(10) Patent No.: US 12,688,809 B2
(45) Date of Patent: Jul. 21, 2026

(54) DISPLAY METHOD, TERMINAL DEVICE, AND COMPUTER-READABLE STORAGE MEDIUM

(71) Applicant: HONOR DEVICE CO., LTD., Shenzhen (CN)

(72) Inventors: Qingtao Hao, Shenzhen (CN); Wenli Zhang, Shenzhen (CN); Di Huang, Shenzhen (CN); Kejia Zhu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/993,051

(22) PCT Filed: Nov. 14, 2023

(86) PCT No.: PCT/CN2023/131532
§ 371 (c)(1),
(2) Date: Jan. 10, 2025

(87) PCT Pub. No.: WO2024/152708
PCT Pub. Date: Jul. 25, 2024

(65) Prior Publication Data
US 2026/0031008 A1 Jan. 29, 2026

(30) Foreign Application Priority Data
Jan. 19, 2023 (CN) .......................... 202310125185.8

(51) Int. Cl.
*G09G 3/00* (2006.01)
*G06F 1/16* (2006.01)

(52) U.S. Cl.
CPC ........... *G09G 3/035* (2020.08); *G06F 1/1641* (2013.01); *G09G 2330/026* (2013.01); *G09G 2330/027* (2013.01); *G09G 2354/00* (2013.01)

(58) Field of Classification Search
None
See application file for complete search history.

(56) References Cited

U.S. PATENT DOCUMENTS

2003/0231143 A1 12/2003 Nakamura et al.
2011/0241998 A1 10/2011 Mckinney et al.
(Continued)

FOREIGN PATENT DOCUMENTS

CN 107273130 A 10/2017
CN 109979413 A 7/2019
(Continued)

*Primary Examiner* — Aneeta Yodichkas
(74) *Attorney, Agent, or Firm* — Fish & Richardson P.C.

(57) ABSTRACT

Embodiments of this application provide a display method, a terminal device, and a computer-readable storage medium. The method is applied to the terminal device that includes an outer display screen and an inner display screen. The method includes: obtaining identification information of a first process when the unfolding event is identified, where the first process is a process that is in the terminal device and that is related to display of the inner display screen; adjusting the first process from a first priority to a second priority based on the identification information of the first process, where the second priority is higher than the first priority; scheduling, based on the second priority, the first process for running; and lighting up the inner display screen and displaying an interface on the inner display screen after running of the first process is completed.

20 Claims, 12 Drawing Sheets

(56)         References Cited

U.S. PATENT DOCUMENTS

| | | |
|---|---|---|
| 2014/0176976 A1 | 6/2014 | Tsukahara et al. |
| 2021/0306396 A1 | 9/2021 | Kye et al. |
| 2022/0245229 A1* | 8/2022 | Zhang .................. G06F 1/1677 |
| 2022/0335406 A1 | 10/2022 | Xu et al. |
| 2023/0325208 A1 | 10/2023 | Hu et al. |

FOREIGN PATENT DOCUMENTS

| | | | |
|---|---|---|---|
| CN | 110719351 A | 1/2020 |
| CN | 110727311 A | 1/2020 |
| CN | 111813520 A | 10/2020 |
| CN | 110019873 B | 8/2021 |
| CN | 113535340 A | 10/2021 |
| CN | 114077468 A | 2/2022 |
| CN | 115016706 A | 9/2022 |
| CN | 115097994 A | 9/2022 |

* cited by examiner

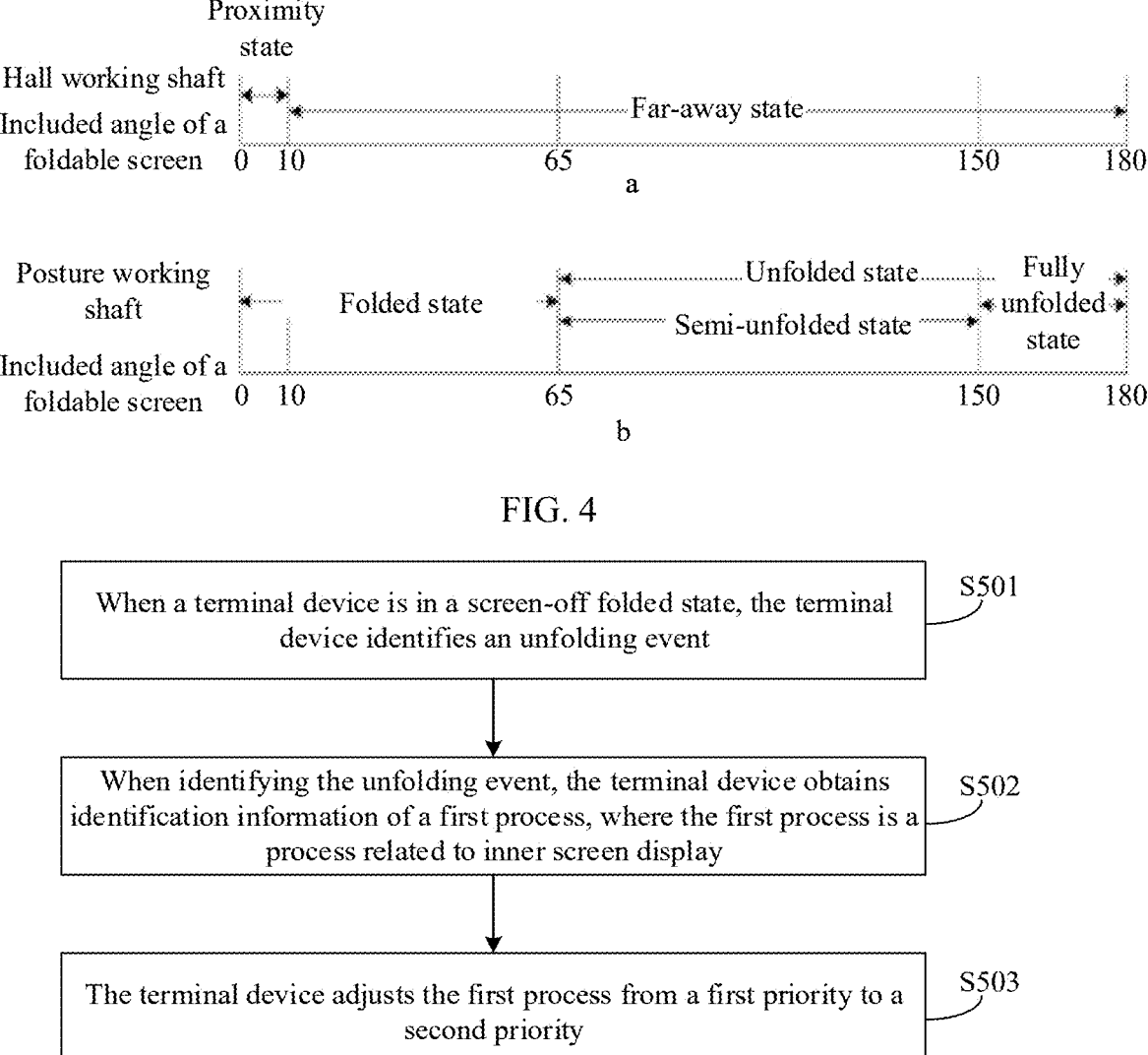

FIG. 4

When a terminal device is in a screen-off folded state, the terminal device identifies an unfolding event        S501

When identifying the unfolding event, the terminal device obtains identification information of a first process, where the first process is a process related to inner screen display        S502

The terminal device adjusts the first process from a first priority to a second priority        S503

FIG. 5

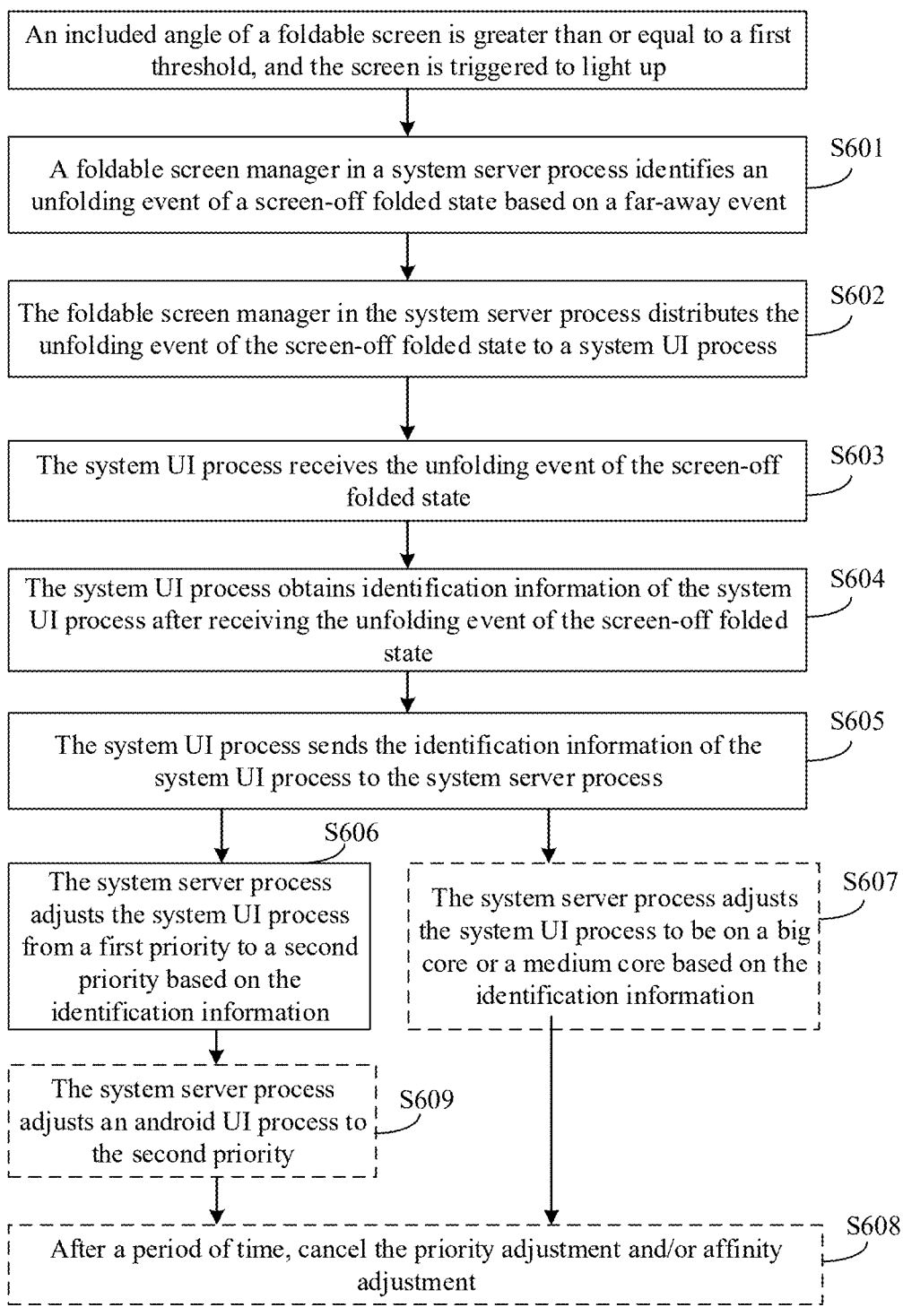

An included angle of a foldable screen is greater than or equal to a first threshold, and the screen is triggered to light up A foldable screen manager in a system server process identifies an unfolding event of a screen-off folded state based on a far-away event
S601

The foldable screen manager in the system server process distributes the unfolding event of the screen-off folded state to a system UI process
S602

The system UI process receives the unfolding event of the screen-off folded state
S603

The system UI process obtains identification information of the system UI process after receiving the unfolding event of the screen-off folded state
S604

The system UI process sends the identification information of the system UI process to the system server process
S605

S606

The system server process adjusts the system UI process from a first priority to a second priority based on the identification information The system server process adjusts the system UI process to be on a big core or a medium core based on the identification information
S607

The system server process adjusts an android UI process to the second priority
S609

After a period of time, cancel the priority adjustment and/or affinity adjustment
S608

FIG. 6

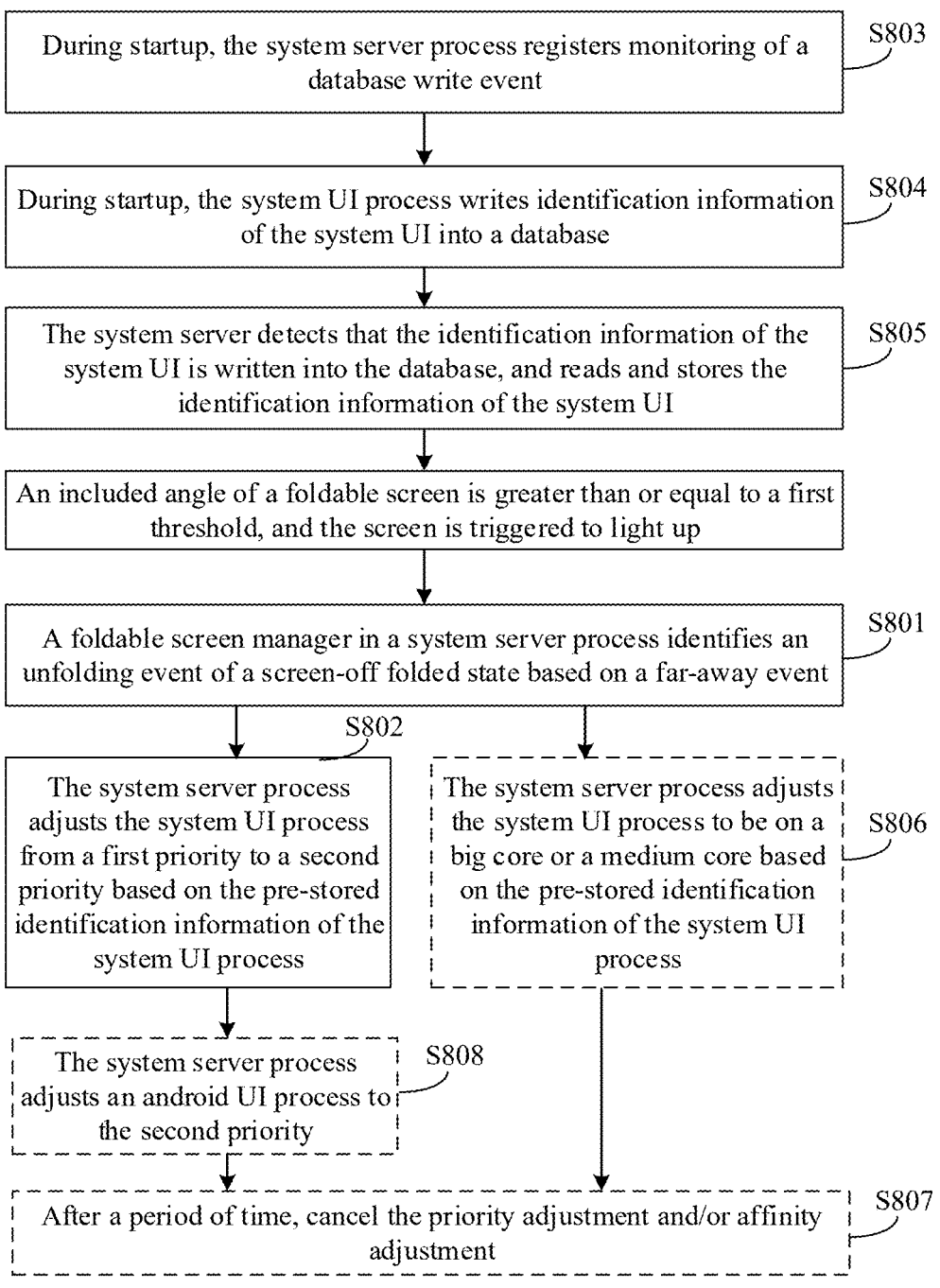

During startup, the system server process registers monitoring of a database write event — S803

During startup, the system UI process writes identification information of the system UI into a database — S804

The system server detects that the identification information of the system UI is written into the database, and reads and stores the identification information of the system UI — S805

An included angle of a foldable screen is greater than or equal to a first threshold, and the screen is triggered to light up A foldable screen manager in a system server process identifies an unfolding event of a screen-off folded state based on a far-away event — S801

S802

The system server process adjusts the system UI process from a first priority to a second priority based on the pre-stored identification information of the system UI process The system server process adjusts the system UI process to be on a big core or a medium core based on the pre-stored identification information of the system UI process — S806

The system server process adjusts an android UI process to the second priority — S808

After a period of time, cancel the priority adjustment and/or affinity adjustment — S807

FIG. 8

DISPLAY METHOD, TERMINAL DEVICE, AND COMPUTER-READABLE STORAGE MEDIUM

CROSS-REFERENCE TO RELATED APPLICATIONS

This application is a National Stage of International Application No. PCT/CN2023/131532, filed on Nov. 14, 2023, which claims priority to Chinese Patent Application No. 202310125185.8, filed on Jan. 19, 2023, both of which are hereby incorporated by reference in their entireties.

TECHNICAL FIELD

This application relates to the field of terminal technologies, and in particular, to a display method, a terminal device, and a computer-readable storage medium.

BACKGROUND

With the development of current flexible screen technologies, a flexible foldable screen (which may also be referred to as a foldable screen) has been applied to a terminal device such as a mobile phone, so that a user can perform an operation of folding or unfolding the terminal device such as the mobile phone to meet requirements of the user for using different screen sizes.

When the terminal device receives the unfolding operation and switches from a screen-off folded state to an unfolded state, the terminal device triggers an inner screen to light up, and displays an interface on the inner screen.

However, in an existing solution, a time taken from receiving the unfolding operation of the user by the terminal device to lighting up a display interface on the inner screen is long, leading to poor user experience.

SUMMARY

Embodiments of this application provide a display method, a terminal device, and a computer-readable storage medium, which are applied to the field of terminal technologies. A scenario in which a screen-off folded state is switched to a screen-on unfolded state is identified, and a resource is configured for the scenario and a priority of a related process is adjusted, so that a waiting time during which a process is not scheduled due to reasons such as a low priority is shortened, thereby increasing a display speed and improving user experience.

According to a first aspect, an embodiment of this application provides a display method, which is applied to a terminal device. The terminal device includes an outer display screen and an inner display screen, and a status of the terminal device includes a folded state and an unfolded state. The method includes:

The terminal device identifies an unfolding event when the terminal device is in the folded state and the outer display screen is off, where the unfolding event is used to indicate the terminal device to switch from the folded state to the unfolded state. The terminal device obtains identification information of a first process when identifying the unfolding event, where the first process is a process that is in the terminal device and that is related to display of the inner display screen. The terminal device adjusts the first process from a first priority to a second priority based on the identification information of the first process, where the second priority is higher than the first priority. The terminal device schedules, based on the second priority, the first process for running. After running of the first process is completed, the terminal device lights up the inner display screen and displays an interface on the inner display screen.

It may be understood that the first process includes one or more of the following: a thread related to image drawing and rendering, a thread related to composition and display, and another process related to display. For example, the first process may be a system UI process. The system UI process is used to draw a lock screen interface. The identification information is used to identify a corresponding process for distinguishing. The identification information may be a name, a number, or the like. The identification information of the first process may be a unique identification code (tid) of the first process.

In this way, a scenario in which a screen-off folded state is switched to a screen-on unfolded state is identified, and a resource is configured for the scenario and a priority of a related process is adjusted, so that a waiting time during which a process is not scheduled due to reasons such as a low priority is shortened, thereby increasing a display speed and improving user experience.

Optionally, that the terminal device obtains identification information of a first process when identifying the unfolding event includes: The terminal device obtains the identification information of the first process when invoking the first process.

The terminal device may obtain the identification information through inter-process communication, and further adjust the priority of the first process by using the identification information, thereby shortening a waiting time of the first process and improving user experience.

Optionally, that the terminal device obtains identification information of a first process when identifying the unfolding event includes: The terminal device reads the identification information of the first process from a local cache when identifying the unfolding event.

The terminal device may obtain the identification information from the local cache. In this way, the identification information is obtained without requiring inter-process communication, thereby reducing communication load and enhancing timeliness guarantee.

Optionally, before the terminal device identifies the unfolding event when the terminal device is in the screen-off folded state, the method further includes: The terminal device writes the identification information of the first process into a database when the first process is started. The terminal device stores the identification information of the first process in the local cache when detecting that the identification information of the first process is written into the database.

This may reduce repeated reading of the database, reduce signaling consumption, and improve user experience.

Optionally, the first process includes a system interface process, and the system interface process is used to draw an interface.

The terminal device may adjust a priority of a process that is used to draw an interface, to accelerate drawing of an interface displayed on the inner screen, shorten a preparation time of the interface displayed on the inner screen, and shorten a screen-on display time.

Optionally, after running of the first process is completed, the method further includes: The terminal device adjusts the first process from the second priority to the first priority.

In this way, the first process is preferentially scheduled in a period in which the terminal device starts the inner display screen for screen-on display, so as to shorten the screen-on display time. In addition, interference to subsequent display or another function may be reduced.

Optionally, the first process is a system interface process. That the terminal device adjusts the first process from the second priority to the first priority includes: The terminal device adjusts the first process from the second priority to the first priority when the first process completes drawing of the interface.

The terminal device may reduce interference to subsequent display or another function.

Optionally, the method further includes: adjusting the first process from the second priority to the first priority upon expiration of a preset time interval after the first process is adjusted from the first priority to the second priority.

The preset time interval may correspond to a time threshold in the following description.

In this way, the first process is preferentially scheduled in a period in which the terminal device starts the inner display screen for screen-on display, so as to shorten the screen-on display time. In addition, interference to subsequent display or another function may be reduced.

Optionally, the method further includes: The terminal device adjusts the first process from the second priority to the first priority when the inner display screen is lighted up.

In this way, the first process is preferentially scheduled in a period in which the terminal device starts the inner display screen for screen-on display, so as to shorten the screen-on display time. In addition, interference to subsequent display or another function may be reduced.

Optionally, a processor CPU of the electronic device includes a plurality of cores. The method further includes: The terminal device adjusts the first process from a first CPU core to a second CPU core, where a computing capability of the second CPU core is greater than a computing capability of the first CPU core.

In this way, affinity of the first process is adjusted, so that the first process runs on a core with a higher computing capability, thereby shortening a running time of the first process, and shortening a screen-on display time.

Optionally, the method further includes: The first process invokes a second process after the first process is adjusted from the first priority to the second priority. The terminal device adjusts the second process from a third priority to the second priority, where the second process is a process invoked in response to the first process.

In this way, the priority of the second process is adjusted to reduce a running wait time of the second process, so that a time during which the first process invokes the second process can be shortened, a waiting time of the first process can be shortened, and a screen-on display time can be shortened, thereby improving user experience.

In this way, the method further includes: The terminal device adjusts a third process from a fourth priority to the second priority, where the third process has a dependency relationship with the first process.

This may increase an execution speed of a lock holding process, reduce additional waiting overheads generated by the system UI process due to lock contention, and shorten a time consumed by an inner screen display process.

Optionally, the method further includes: The terminal device deletes a lock in a fourth process, where the fourth process is the first process, and/or a process that uses a same lock as the first process.

In this way, the terminal device deletes some locks to increase an execution speed of the lock holding process, thereby shortening a sleep time of a process in the terminal device, and further shortening a time consumed by an inner screen display process.

According to a second aspect, an embodiment of this application provides an electronic device, and the electronic device includes a terminal device. The terminal device may also be referred to as a terminal (terminal), user equipment (user equipment, UE), a mobile station (mobile station, MS), a mobile terminal (mobile terminal, MT), or the like. The terminal device may be a mobile phone (mobile phone), a smart TV, a wearable device, a tablet computer (Pad), a computer having a wireless transceiver function, a virtual reality (virtual reality, VR) terminal device, an augmented reality (augmented reality. AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

The electronic device includes a processor and a memory. The memory stores computer-executable instructions. The processor executes the computer-executable instructions stored in the memory, to enable the electronic device to perform the method according to the first aspect.

According to a third aspect, an embodiment of this application provides a computer-readable storage medium, and the computer-readable storage medium stores a computer program. When the computer program is executed by a processor, the method according to the first aspect is implemented.

According to a fourth aspect, an embodiment of this application provides a computer program product, and the computer program product includes a computer program. When the computer program is run, a computer is enabled to perform the method according to the first aspect.

According to a fifth aspect, an embodiment of this application provides a chip. The chip includes a processor, and the processor is configured to invoke a computer program in a memory to perform the method according to the first aspect.

It should be understood that the technical solutions of the second aspect to the fifth aspect of this application correspond to the technical solutions of the first aspect of this application, and beneficial effects achieved by the aspects and corresponding feasible implementations are similar. Details are not described herein again.

BRIEF DESCRIPTION OF DRAWINGS

FIG. 4 is a schematic flowchart of a foldable screen change in a foldable screen unfolding process according to an embodiment of this application;

FIG. 5 is a schematic flowchart of a display method according to an embodiment of this application;

FIG. 6 is a schematic flowchart of a display method according to an embodiment of this application;

FIG. 8 is a schematic flowchart of a display method according to an embodiment of this application;

DESCRIPTION OF EMBODIMENTS

Figure 1:
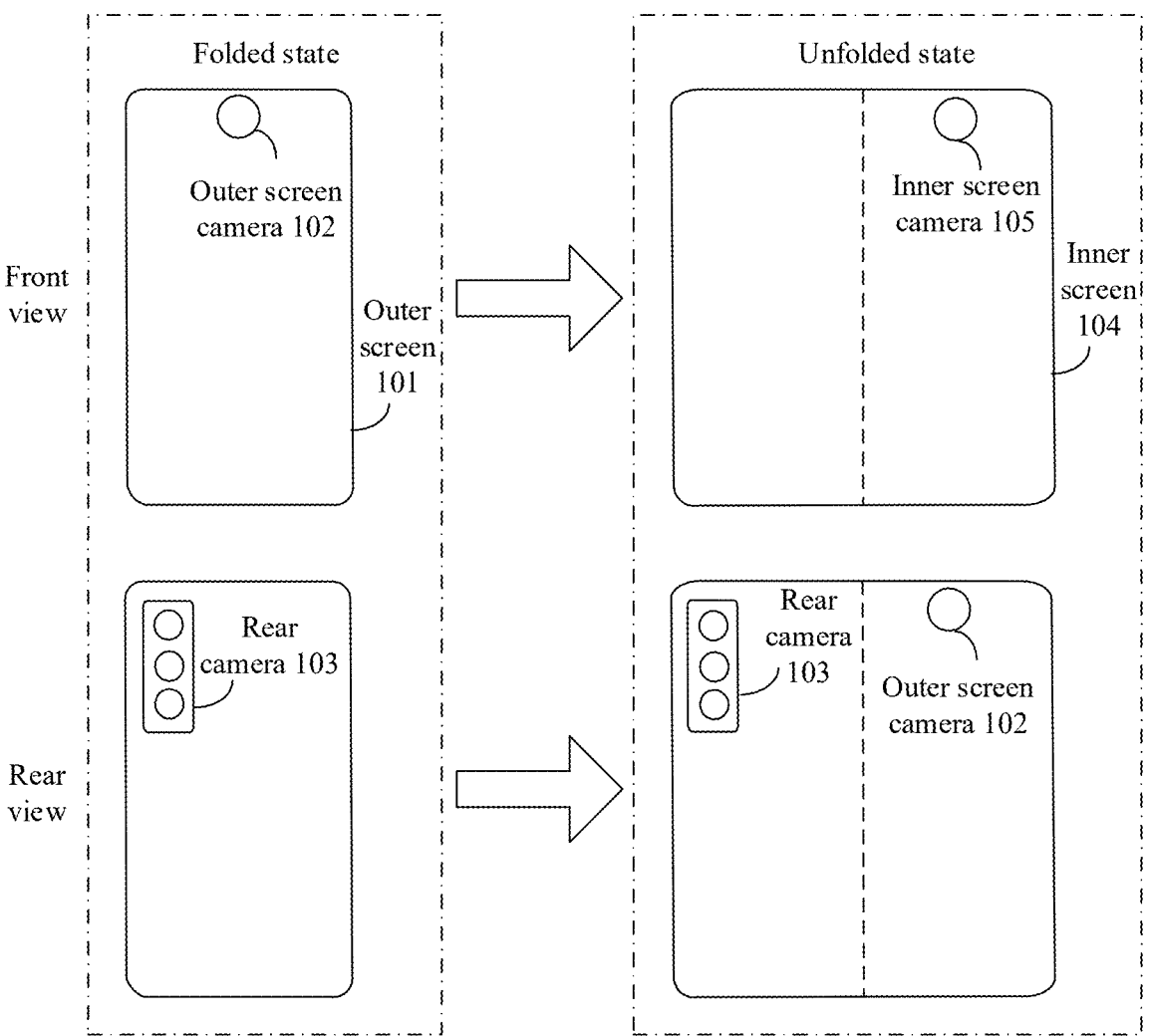
FIG. 1 is a schematic diagram of a structure of a terminal device according to an embodiment of this application.

To clearly describe the technical solutions in embodiments of this application, the following briefly describes some terms and technologies in the embodiments of this application.

1. Other Terms

In the embodiments of this application, words such as "first" and "second" are used to distinguish between same items or similar items with basically the same functions and effects. For example, a first chip and a second chip are merely intended to distinguish between different chips, and are not intended to limit a sequence of the first chip and the second chip. A person skilled in the art may understand that the words such as "first" and "second" do not limit a quantity and an execution sequence, and the words such as "first" and "second" do not indicate a definite difference.

It should be noted that the words such as "example" or "for example" in the embodiments of this application are used to indicate an example, an illustration, or a description. Any embodiment or design solution described as "example" or "for example" in this application should not be construed as being preferred or advantageous over other embodiments or design solutions. Exactly, use of the words such as "example" or "for example" is intended to present related concepts in a specific manner.

In the embodiments of this application, "at least one" means one or more, and "a plurality of" means two or more. "And/Or" describes an association relationship between associated objects, and represents that three relationships may exist. For example, "A and/or B" may represent the following cases: Only A exists, both A and B exist, and only B exists, where A and B may be singular or plural. The character "/" usually represents an "or" relationship between associated objects. "At least one of the following items" or a similar expression means any combination of these items, including a single item or any combination of a plurality of items. For example, at least one of a, b, or c may represent a, b, c, a-b, a-c, b-c, or a-b-c, where a, b, and c may be singular or plural.

2. Terminal Device

A terminal device in the embodiments of this application may alternatively be an electronic device in any form. For example, the electronic device may include a handheld device with an image processing function, an onboard device, or the like. For example, some electronic devices are a mobile phone (mobile phone), a tablet computer, a palmtop computer, a notebook computer, a mobile internet device (mobile internet device, MID), a wearable device, a virtual reality (virtual reality VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, an onboard device, a wearable device, a terminal device in a 5G network, a terminal device in a future evolved public land mobile network (public land mobile network, PLMN), and the like. This is not limited in the embodiments of this application.

As an example rather than a limitation, in the embodiments of this application, the electronic device may alternatively be a wearable device. The wearable device may also be referred to as a wearable smart device, and is a generic term for wearable devices such as glasses, gloves, watches, clothing, and shoes that are intelligently designed and developed from daily wear by using wearable technologies. The wearable device is a portable device that is worn directly on a body or integrated into clothing or accessories of a user. The wearable device is not merely a hardware device, but can implement powerful functions through software support, data interaction, and cloud interaction. In a broad sense, the wearable smart device includes a full-featured and large-size device that can implement all or some of functions without relying on a smartphone, for example, a smartwatch or smart glasses, and a device that focuses only on a specific type of application function and needs to be used together with another device such as a smartphone, for example, various types of smart bands and smart jewelry that monitor physical signs.

In addition, in the embodiments of this application, the electronic device may alternatively be a terminal device in an internet of things (internet of things, IoT) system. IoT is an important part in future development of information technologies, and a main technical feature thereof is connecting a thing to a network through a communication technology, to implement an intelligent network of human-machine interconnection and interconnection between things.

The electronic device in the embodiments of this application may also be referred to as a terminal device, user equipment (user equipment, UE), a mobile station (mobile station, MS), a mobile terminal (mobile terminal, MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

In the embodiments of this application, the electronic device or each network device includes a hardware layer, an operating system layer that runs above the hardware layer, and an application layer that runs above the operating system layer. The hardware layer includes hardware such as a central processing unit (central processing unit, CPU), a memory management unit (memory management unit, MMU), and a memory (also referred to as a main memory). The operating system may be any one or more computer operating systems for implementing service processing through a process (process), for example, a Linux operating system, a Unix operating system, an Android operating system, an iOS operating system, or a windows operating system. The application layer includes applications such as a browser, an address book, word processing software, and instant messaging software.

For example, FIG. 1 is a schematic diagram of a front view and a rear view of a terminal device with a foldable screen according to an embodiment of this application.

As shown in FIG. 1, the terminal device may include a folded state and an unfolded state. The folded state may be understood that an included angle between screens on two sides of the foldable screen is less than or equal to a first value. The unfolded state may be understood that the included angle between the screens on two sides of the foldable screen is greater than or equal to a second value.

In a possible implementation, the first value is equal to the second value. This implementation may alternatively be understood that the terminal device is either in a folded state or in an unfolded state.

In another possible implementation, the second value is greater than the first value. In this implementation, the terminal device may further include a transition state. The transition state may be understood as a state in which the included angle between the screens on two sides of the foldable screen is greater than the first value and less than the second value.

As shown in FIG. 1, when the terminal device is in the folded state, a display screen facing the user in the front view may be referred to as an outer screen, and a backplane facing the user in the rear view may be referred to as a backplane. When the terminal device is in the unfolded state, a display screen facing the user in the front view may be referred to as an inner screen (or a foldable screen), and the outer screen and the backplane in the rear view may be unfolded on one plane.

In other words, when the terminal device is in the folded state, the inner screen may be folded and hidden, and the outer screen may be configured to display an interface. When the terminal device is in the unfolded state, the inner screen may be unfolded, and the inner screen may be configured to display an interface.

Further, as shown in FIG. 1, a camera may be disposed in each of the inner screen, the outer screen, and the backplane of the terminal device.

It may be understood that the terminal device may include one or more outer screen cameras and/or one or more inner screen cameras. The outer screen camera may be disposed at any position of the outer screen. The inner screen camera may be disposed at any position of the inner screen. For example, the inner screen camera may be disposed on display screens on two sides when the inner screen is unfolded, or may be disposed on a display screen on any side when the inner screen is unfolded. This embodiment of this application sets no limitation on a quantity of inner screen cameras, a position of an inner screen camera, a quantity of outer screen cameras, and a position of an outer screen camera.

For example, in the terminal device shown in FIG. 1, when the terminal device is in the folded state, an outer screen 101 and an outer screen camera 102 on the outer screen may be seen in a front view. A rear camera 103 may be seen in a corresponding rear view.

When the terminal device is in the unfolded state, the inner screen is opened, and an inner screen 104 and an inner screen camera 105 on the inner screen may be seen in the front view. The rear camera 103 and the outer screen camera 102 on the outer screen may be seen in the corresponding rear view. The inner screen 104 may be divided into two parts: the left part and the right part.

It may be understood that when the terminal device receives the unfolding operation, the terminal device switches from the folded state to the unfolded state, triggers the inner screen to light up, and displays an interface on the inner screen.

When the terminal device switches from the screen-off folded state to the unfolded state, the terminal device triggers the inner screen to light up, and displays an interface on the inner screen.

However, a time taken from receiving the unfolding operation by the terminal device to lighting up a display interface on the inner screen is long, leading to poor user experience.

In a possible design 1, the terminal device triggers, based on a Hall sensor, the inner screen to light up. For example, when the Hall sensor detects that an included angle between screens on two sides of the foldable screen is greater than 10 degrees, the terminal device triggers to start lighting of the inner screen.

In this way, the terminal device may start lighting of the inner screen when the included angle between the screens on two sides of the foldable screen is small, thereby shortening a time from receiving the unfolding operation by the terminal device to lighting up the inner screen. It may also be understood that a time during which the terminal device triggers the inner screen to light up is shortened.

However, in this manner, a subsequent process of lighting up the inner screen is not improved, and an improvement effect is limited. Consequently, it takes a long time for the inner screen to light up a display interface.

In a possible design 2, the terminal device performs frequency increasing processing on the processor.

For example, when detecting a scenario in which the screen-off folded state is switched to the unfolded state, the terminal device increases a frequency of the processor of the terminal device, so as to improve a computing capability of the terminal device, increase a computing speed of the processor of the terminal device, and further shorten a time from the screen-off folded state to the screen-on unfolded state.

However, in a period in which the screen-off folded state is switched to the screen-on unfolded state, the terminal device needs to process a large quantity of services. Consequently, system load is heavy and an improvement effect is limited. In addition, in the possible design 2, frequency increasing is performed for all processes of the terminal device. The terminal device may experience a case in which a related process that affects lighting of the inner screen is not executed or is slowly executed because the process is not scheduled or is not provided with sufficient resources due to reasons such as a low priority. Consequently, a screen lighting speed of the terminal device is low.

In view of this, an embodiment of this application provides a display method, so as to identify a scenario in which a screen-off folded state is switched to a screen-on unfolded state, and configure a resource for the scenario and adjust a priority of a related process, so that a waiting time during which a process is not scheduled due to reasons such as a low priority is shortened, thereby increasing a display speed and improving user experience.

For ease of understanding, the following describes a software system of the terminal device. A software system of the terminal device may use a layered architecture, an event-driven architecture, a microkernel architecture, a microservice architecture, a cloud architecture, or the like. Details are not described herein again. In the embodiments of this application, an Android system with a layered architecture is used as an example to describe a software structure of the terminal device.

Figure 2:
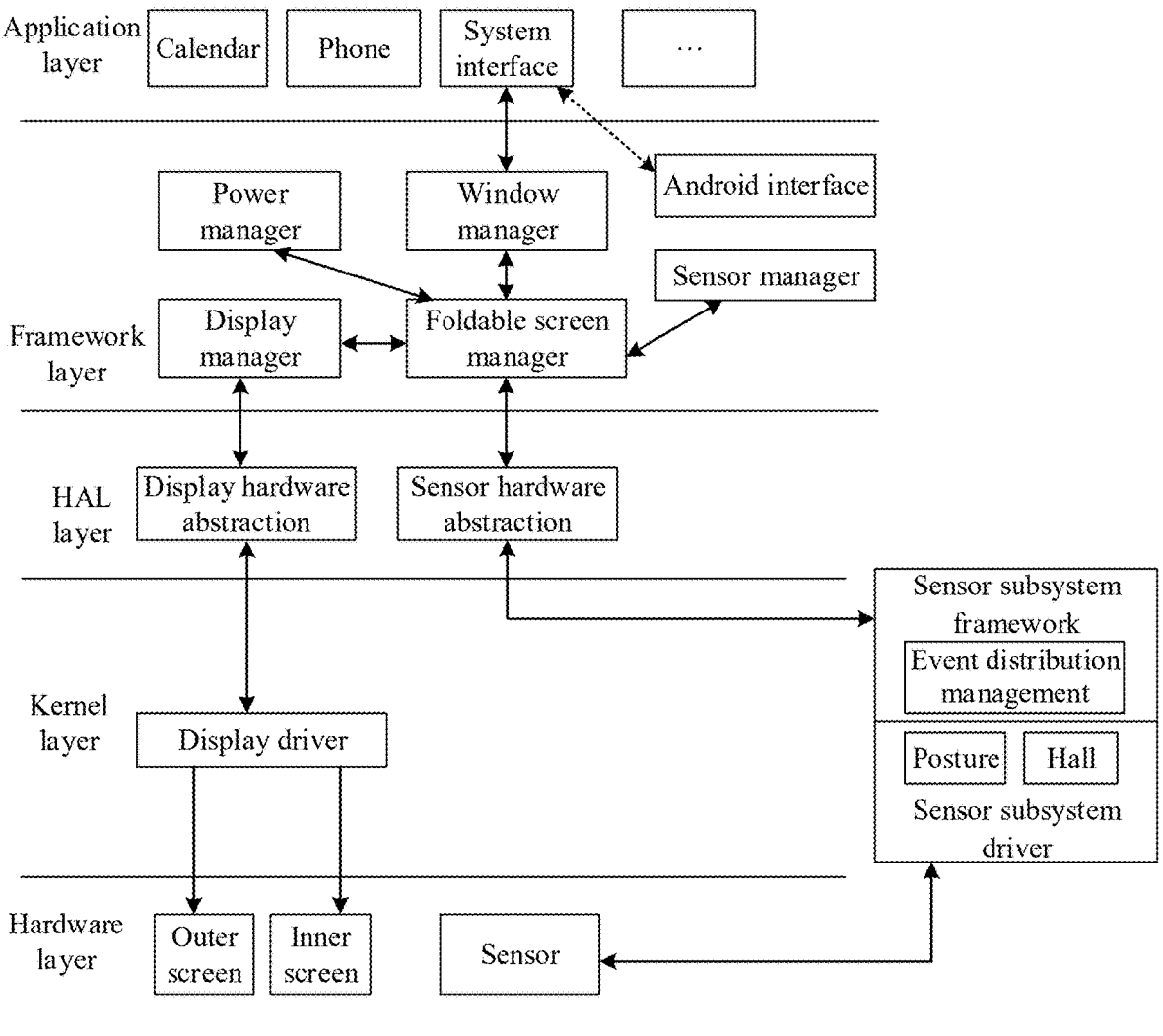
FIG. 2 is a schematic diagram of a software structure of a terminal device according to an embodiment of this application.

FIG. 2 is a block diagram of a software structure of a terminal device according to an embodiment of this application. In a layered architecture, software is divided into several layers, and each layer has a clear role and task. The layers communicate with each other by using software interfaces. In some embodiments, the Android (android) system may be divided into five layers: an application layer, an application framework (framework) layer, a hardware abstraction layer (hardware abstraction layer, HAL), a kernel (kernel) layer, and a hardware layer from top to bottom.

The application layer may include a series of application packages. The application layer runs an application by invoking an application programming interface (application programming interface, API) provided by the application framework layer. As shown in FIG. 2, the application package may include applications such as Camera, Calendar, Phone, Maps, Phone, Music, Settings, Email, Videos, Social, and the like, and a system interface (system UI).

The system interface is used to manage the terminal device to lock a screen, unlock a screen, or the like.

The application framework layer provides an application programming interface (application programming interface, API) and a programming framework for the applications at the application layer. The application framework layer includes some predefined functions.

As shown in FIG. 2, the application framework layer may include a power manager (power manager service), a window manager (window manager service), a display manager (display manager service), a foldable screen manager (device state manager service), a sensor manager (sensor service), an Android interface process (android UI process), and the like.

The power manager may control each component in the terminal device to be powered on or powered off. For example, the power manager controls the inner screen of the terminal device to be powered on for display, the inner screen to be powered off for screen-off, the outer screen to be powered on for display, the outer screen to be powered off for screen-off, and so on.

The window manager is configured to manage a window program. The window manager may obtain a size of a display screen, determine whether there is a status bar, lock a screen, touch a screen, drag a screen, take a screenshot, and so on. The window manager further sends a configuration change event (config change event) to the system interface (system UI), to light up the screen after the system interface rearranges drawing of the lock screen interface based on the configuration change.

The display manager may manage screen display of the terminal device, map and switch the logical screen, switch screen resolution, and so on. For example, the display manager registers with the foldable screen manager to monitor a status of the foldable screen. When the foldable screen is in the folded state, the display manager controls the terminal device to display an interface on the outer screen. When the foldable screen is in the unfolded state, the display manager controls the terminal device to display an interface on the inner screen.

The foldable screen manager may manage the status of the foldable screen. For example, the foldable screen manager may calculate the status of the foldable screen, and notify another module (for example, the power manager and the display manager) of the status of the foldable screen, so that the another module performs processing (for example, power-on switching between the inner screen and the outer screen, and switching of the display screen) based on the status of the foldable screen. It may be understood that the foldable screen manager may further feed back the state of the foldable screen in response to a command that is sent by the another module and that is used to obtain the status of the foldable screen.

Alternatively, it may be understood that the foldable screen manager may monitor a folding status change or a posture change of the terminal device, perform fusion calculation on a device state of the terminal device, and notify the monitoring service to perform a corresponding response action, so as to help the another module perform processing based on the status of the foldable screen, for example, trigger the display manager to map and switch the logical screen, trigger the power manager to perform power-on and power-off switching between the inner screen and the outer screen, and trigger the window manager to perform drawing again based on screen switching.

The foldable screen manager further registers a requirement of the posture sensor and the Hall sensor with the sensor service, manages registration and event fusion calculation of the posture sensor and the Hall sensor, and determines the status of the foldable screen of the terminal device.

The sensor manager is configured to manage a status of a sensor, and the like. The sensor manager may register the posture sensor and the Hall sensor with sensor hardware abstraction, and monitor an event change notification of the sensor hardware abstraction. The sensor manager detects a change in the posture sensor or the Hall sensor, notifies the foldable screen manager to trigger event fusion calculation, and distributes a calculation result to a related monitoring service (for example, a display manager, a power manager, or a window manager).

The android UI process and the system interface (system UI) have a lock contention relationship during configuration. The system interface (system UI) relies on lock protection in the android UI process during reconfiguration and drawing.

An objective of the HAL layer is to abstract hardware, so as to provide a unified interface for querying a hardware device for an upper-layer application, or provide a data storage service for an upper-layer application. As shown in FIG. 2, the HAL layer may include display hardware abstraction and sensor hardware abstraction (sensor hidl).

The display hardware abstraction may control the outer screen and the inner screen.

The sensor hardware abstraction may control a sensor and monitor an event change notification of a sensor driver. For example, the sensor manager registers a posture sensor and a Hall sensor with the hidl service in the sensor hardware abstraction to monitor an event change notification of the sensor hidl service.

A plurality of modules at the HAL layer may comply with a hardware abstraction layer interface definition language (HAL interface definition language, HIDL) or an AIDL.

The kernel layer is a layer between hardware and software. As shown in FIG. 2, the kernel layer may include one or more of the following: a display driver, a sensor driver, a camera driver, and the like.

The sensor driver supports a registration event of the sensor hardware abstraction, and reports a parameter change event of the sensor driver to the Hidl process registered with the sensor hardware abstraction. For example, a Hall driver in the sensor driver may send a far-away event or a proximity event to the sensor hardware abstraction.

In some embodiments, the sensor driver includes a sensor subsystem framework and a sensor subsystem driver that are located in a coprocessor (SCP).

It may be understood that the terminal device may include an application processor (AP) and a coprocessor (SCP). The application processor includes the application framework layer, the hardware abstraction layer, the kernel layer, and the like. The coprocessor includes the sensor subsystem framework and the sensor subsystem driver.

The sensor subsystem framework includes an event distribution management module. The event distribution management module is responsible for transferring a change event of the sensor from inter-core communication to the sensor hardware abstraction. The sensor subsystem driver supports a registration event of the sensor hardware abstraction, and reports a parameter change event of the sensor subsystem driver to the Hidl process registered with the sensor hardware abstraction. For example, a far-away event or a proximity event is sent to the sensor hardware abstraction through the event distribution management module.

It should be understood that, in some embodiments, a layer that implements a same function may be referred to as another name, or a layer that can implement functions of a plurality of layers may be used as one layer, or a layer that can implement functions of a plurality of lavers may be divided into a plurality of layers. This is not limited in this embodiment of this application.

The following describes a display process of the terminal device during unfolding of the foldable screen with reference to FIG. 2.

When the terminal device receives an unfolding operation, a sensor of the terminal device detects a far-away event or the like. The sensor outputs a corresponding signal and reports the signal to the sensor driver. The sensor driver processes the corresponding signal output by the sensor, to obtain status information of the foldable screen (for example, a posture and a far-away event of the terminal device). The sensor driver reports the status information of the foldable screen to the foldable screen manager through the sensor hardware abstraction. The foldable screen manager determines status change information (for example, a change from a folded state to an unfolded state) of the foldable screen based on the status information of the foldable screen. The posture of the terminal device may include the folded state or the unfolded state. The unfolded state may include a semi-unfolded state and a fully unfolded state.

In an example in which the status change information of the foldable screen is the change from the folded state to the unfolded state, the foldable screen manager sends the status change information of the foldable screen to the display manager to manage a logical screen. The display manager delivers the status change information of the foldable screen to the display hardware abstraction. After receiving the status change information of the foldable screen, the display hardware abstraction confirms that the foldable screen is switched from the outer screen to the inner screen. The display hardware abstraction delivers, to the display driver, an instruction used to instruct to enable the inner screen. The display driver drives the hardware layer to enable the inner screen. The terminal device starts to display an image on the inner screen.

It may be understood that, when switching from the screen-off folded state to the unfolded state, the terminal device triggers a plurality of managers of a framework layer on an application processing side (AP side), a system manager on an application side (APP side), and a lock screen drawing process carried by these managers. The following describes an internal interaction process of the terminal device during lighting of the inner screen with reference to FIG. 3.

S301: In a process in which the terminal device switches from a screen-off folded state to an unfolded state, a Hall sensor in the terminal device detects that an included angle of the foldable screen is greater than a first threshold.

S302: A Hall driver in a sensor driver reports a far-away event to sensor hardware abstraction.

S303: After receiving the far-away event, the sensor hardware abstraction distributes the far-away event to a sensor manager, S304: The sensor manager distributes the far-away event to a foldable screen manager.

S305: The foldable screen manager determines, based on the far-away event and a current state of the foldable screen, that the terminal device switches from the folded state to the unfolded state, and sends an unfolding event to a display manager, so as to invoke the display manager to switch a logical screen.

The unfolding event is used to indicate the terminal device to switch from the folded state to the unfolded state.

S306: The display manager determines, based on the unfolded state, to switch the logical screen, and makes a logical screen 0 point to the inner screen. That the logical screen 0 is switched from pointing to the outer screen to pointing to the inner screen may be understood as switching from outer screen display to inner screen display.

It may be understood that when the terminal device is in the folded state, the logical screen 0 points to the outer screen, and the terminal device displays an interface on the outer screen. When the terminal device is in the unfolded state, the logical screen 0 points to the inner screen, and the terminal device displays an interface on the inner screen.

S307: The display manager invokes a power manager to power on the inner screen, so as to subsequently display an interface on the inner screen. In addition, the display manager further invokes a window manager to manage a window program.

S308: The window manager reloads configuration information based on the inner screen. The configuration information includes a size, resolution, and the like of the inner screen. After reloading the configuration information, the window manager sends a configuration modification event to a system interface.

S309: The system interface rearranges drawing based on the configuration information in the configuration modification event, so as to display the interface on the inner screen.

S310: After drawing and rendering are completed, a power management service is invoked through a window management service and a display management service, so as to light up the inner screen and display the interface on the inner screen.

It should be noted that powering on the inner screen in S307 and rearranging and drawing a trigger window based on new configuration information in S309 are concurrent processes. However, to switch from the screen-off folded state to the unfolded state, a lock screen interface needs to be displayed on the inner screen. Therefore, it is necessary to wait until rearrangement and drawing of all windows that are visible to the user are completed, before the inner screen is triggered to light up.

Figure 3:
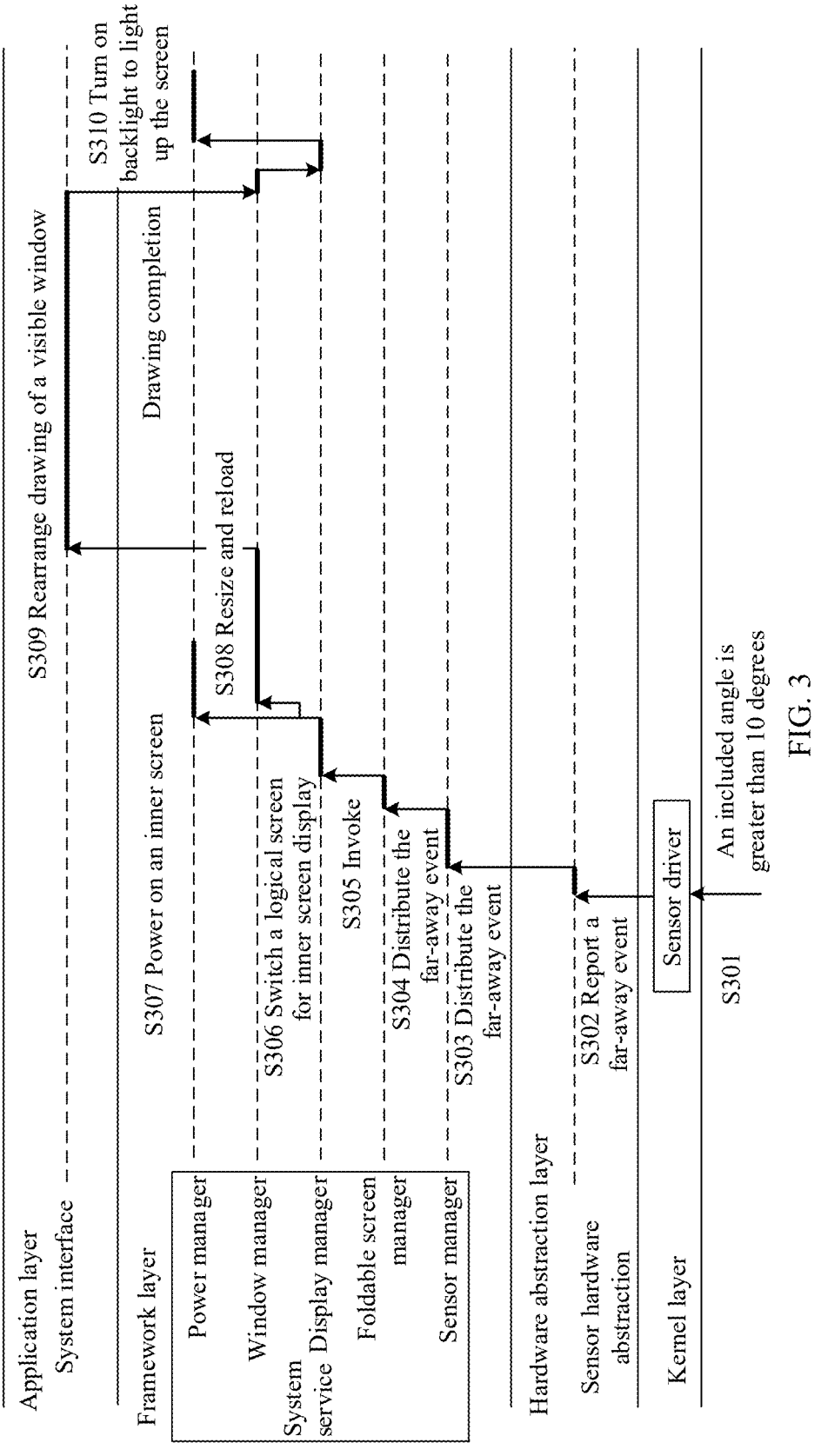
FIG. 3 is a schematic diagram of an internal interaction process when an inner screen of a terminal device is lighted up according to an embodiment of this application.

It can be learned from the interaction process shown in FIG. 3 that, it takes a long time to rearrange and redraw the system interface based on the configuration information in the configuration modification event. Therefore, rearrangement of the system interface based on the new configuration information and redrawing of the system interface are key paths of the scenario. If a speed of drawing the system interface (system UI) increases when the mobile phone is unfolded from the screen-off folded state, a speed of triggering the inner screen to light up also increases.

The following describes a foldable screen change process and scenario identification during unfolding of the foldable screen with reference to FIG. 4.

In some embodiments, the terminal device determines a status of the foldable screen based on a plurality of cases of the included angle of the foldable screen.

For example, the terminal device determines the state of the foldable screen in an unfolding process by using two thresholds. Correspondingly, the terminal device also determines the state of the foldable screen in a folding process by using two thresholds.

Specifically, the terminal device responds to an unfolding operation of the user. If the included angle of the foldable screen changes from being less than or equal to a first threshold (for example, changes from 0 degrees or near 0 degrees), when the included angle of the foldable screen is less than or equal to the first threshold, the terminal device is in a proximity state; or when the included angle of the foldable screen is greater than the first threshold, the terminal device is in a far-away state. The proximity state may be mapped to the folded state, and the far-away state may be mapped to the unfolded state (which may be a semi-unfolded state or a fully unfolded state).

The terminal device responds to the unfolding operation of the user. If the included angle of the foldable screen changes from being greater than the first threshold, when the included angle of the foldable screen is less than or equal to a second threshold, the terminal device is in the folded state; or when the included angle of the foldable screen is greater than the second threshold, the terminal device is in the unfolded state (which may be a semi-unfolded state or a fully unfolded state).

The terminal device responds to the folding operation of the user. If the included angle of the foldable screen changes from being greater than a third threshold (for example, changes from being 180 degrees or near 180 degrees), when the included angle of the foldable screen is less than or equal to the third threshold, the terminal device is in the folded state; or when the included angle of the foldable screen is greater than the third threshold, the terminal device is in the unfolded state (which may be a semi-unfolded state or a fully unfolded state).

The terminal device responds to the folding operation of the user. If the included angle of the foldable screen changes from being less than the third threshold, when the included angle of the foldable screen is less than or equal to a fourth threshold, the terminal device is in the proximity state; or when the included angle of the foldable screen is greater than the fourth threshold, the terminal device is in the far-away state (which may be a semi-unfolded state or a fully unfolded state).

It may be understood that, the fourth threshold is less than the first threshold, the first threshold is less than the third threshold, and the third threshold is less than the second threshold. For example, the first threshold is 10, the second threshold is 65, the third threshold is 60, and the fourth threshold is 5.

In a possible implementation, the terminal device may determine the status of the foldable screen by using the Hall sensor and the posture sensor. The Hall sensor is configured to determine the state of the foldable screen when the included angle of the foldable screen is a small angle. The posture sensor is configured to determine the state of the foldable screen when the included angle of the foldable screen is a large angle.

For example, FIG. 4 is a schematic diagram of a state of a foldable screen during unfolding according to an embodiment of this application. An example in which the first threshold is 10 and the second threshold is 65 is used.

As shown in a in FIG. 4, if the included angle of the foldable screen of the terminal device changes from 0 degrees or near 0 degrees, during unfolding of the foldable screen, when detecting that the included angle of the foldable screen is greater than 10 degrees, the Hall sensor of the terminal device reports a far-away event to the sensor manager through the sensor driver and the sensor hardware abstraction, where the far-away event is used to indicate that a form of the device is switched to a far-away state. The sensor manager sends the far-away event to the foldable screen manager. After receiving the far-away event, the foldable screen manager maps the far-away event to a semi-unfolded state, and triggers the inner screen of the terminal device to light up.

As shown in b in FIG. 4, if the included angle of the foldable screen of the terminal device changes from being greater than 10 degrees, during unfolding of the foldable screen, when detecting that the included angle of the foldable screen is greater than 65 degrees, the posture sensor of the terminal device reports an unfolding event to the sensor manager through the sensor driver and the sensor hardware abstraction, where the unfolding event is used to indicate that a form of the device is switched to an unfolded state (a semi-unfolded state or a fully unfolded state). The sensor manager sends the far-away event to the foldable screen manager. After receiving the unfolding event, the foldable screen manager triggers the inner screen of the terminal device to light up. It may be understood that, the foregoing determining the status of the foldable screen in the terminal device is merely used as an example, and the terminal device may alternatively determine the status of the foldable screen in another manner. This is not limited herein.

The following describes identification of a screen status of the terminal device. The screen status includes a screen-off state and screen-on state.

The screen-off state may be determined by using an interaction state of the terminal device. For example, the terminal device may determine the interaction state of the terminal device by using the boolean is Interactive( ) function in the power manager. When a return value of the function is true (true), it indicates that the terminal device is in the interaction state, that is, in the screen-on state. When the return value of the function is false (false), it indicates that the terminal device is in a non-interaction state, that is, in the screen-off state.

The following describes the display method provided in an embodiment of this application with reference to FIG. 5-FIG. 9B.

S501: When a terminal device is in a screen-off folded state, the terminal device identifies an unfolding event.

The terminal device may identify a screen status by using an interaction state of the terminal device. For details, refer to the foregoing related description. Details are not described herein again.

In this embodiment of this application, that the terminal device is in a screen-off folded state may be understood that an outer screen of the terminal device is off (not displayed) and is in a folded state.

The unfolding event means that the terminal device switches from the folded state to the unfolded state.

In some embodiments, when the terminal device detects that an included angle of a foldable screen changes from being less than a first threshold to being greater than the first threshold, the terminal device identifies the unfolding event. Alternatively, when the terminal device detects that the included angle of the foldable screen changes from being greater than the first threshold to being greater than a second threshold, the terminal device identifies the unfolding event. For the first threshold and the second threshold, refer to the foregoing related description. Details are not described herein again. A manner of identifying the unfolding event is not specifically limited in this embodiment of this application.

It may be understood that, in a process in which the terminal device switches from the screen-off folded state to the unfolded state, when the terminal device detects that the included angle of the foldable screen is greater than or equal to the first threshold, a Hall sensor reports a far-away event to a foldable screen manager through the sensor driver and the sensor hardware abstraction, and the foldable screen manager identifies the unfolding event based on the far-away event, and triggers the terminal device to light up the screen. For a specific process, refer to the foregoing corresponding description of FIG. 4. Details are not described herein again.

S502: When identifying the unfolding event, the terminal device obtains identification information of a first process, where the first process is a process related to inner screen display.

The first process includes a system UI process. The system UI process is used to draw a lock screen interface.

The identification information is used to identify a corresponding process for distinguishing. The identification information may be a name, a number, or the like. The identification information of the first process may be a unique identification code (tid) of the first process.

It may be understood that the terminal device may read the identification information of the first process by invoking the first process. The terminal device may alternatively store the identification information of the first process in a local cache in advance, and obtain the identification information of the first process by using the local cache. A specific process in which the terminal device obtains the identification information of the first process is not limited in this embodiment of this application.

S503: The terminal device adjusts the first process from a first priority to a second priority. The second priority is higher than the first priority.

In this embodiment of this application, compared with a process of the first priority, the terminal device preferentially processes a process of the second priority. This may shorten a waiting time during which the first process is not scheduled due to reasons such as a low priority, thereby increasing a running speed; reduce a time percentage of the first process in a runnable (runnable) state and increase a percentage of the first process in a running (running) state, thereby shortening a screen-on display time.

It may be understood that the terminal device classifies priorities into a real-time priority, a very important process (very important process. VIP) priority, a high priority, a medium priority, and a low priority. The high priority, the medium priority, and the low priority may be collectively referred to as a general priority. A quantity of tasks with the real-time priority and the VIP priority is relatively small, a quantity of tasks with the medium priority and the low priority among the general priorities is relatively large, and a quantity of tasks with the high priority among the general priorities is also relatively small.

It may be understood that the general priorities may be classified into three levels: the high priority, the medium priority, and the low priority, or may be divided into more levels. This is not limited herein.

For example, if the first priority is the medium priority or the low priority, the second priority may be any one of the real-time priority, the VIP priority, or the high priority. If the first priority is the high priority, the second priority may be any one of the VIP priority or the real-time priority.

In some embodiments, priority information is set for the terminal device. The priority information may be a number, or may be other identification information. This is not limited herein. Specifically, the terminal device identifies a priority corresponding to the process by using a number. 0-130 is used as an example. A smaller number corresponding to the process indicates a higher priority. In an example in which the first priority is 100, the second priority may be a number less than 100.

In some embodiments, the first priority is any one of the general priorities, and the second priority is any one of the VIP priority or the high priority. This may shorten a time during which the first process invokes another process, thereby shortening a waiting time of the first process.

It should be noted that when the first process is the real-time priority or the VIP priority, the second process may also be temporarily adjusted to have the same priority. The second process is a process invoked in response to the first process. For example, in an example in which the first process is the system UI process and has the VIP priority, and the second process has the medium priority, the second process has the VIP priority when responding to scheduling of the first process, but the second process has the medium priority when the scheduling ends.

Based on the foregoing embodiment, the terminal device may adjust the first process from the second priority to the first priority after a period of time. It may also be understood that priority adjustment for the first process is cancelled after a period of time.

For example, when the terminal device runs to a specific stage, for example, when the system UI process completes drawing, the system UI may notify, based on inter-process communication, a system server to cancel configuration.

In this way, the first process is preferentially scheduled in a key time period, so as to shorten a screen-on display time. In addition, interference to subsequent display or another function may be reduced.

In a possible implementation 1, the priority adjustment for the first process is cancelled by setting a time threshold. Upon expiration of the time threshold after the terminal device adjusts the first process to the second priority, the terminal device adjusts the first process from the second priority to the first priority.

For example, at a first moment, the terminal device sets the first process to be adjusted from the first priority to the second priority. At a second moment, the terminal device sets the first process to be adjusted from the second priority to the first priority. A difference between the second moment and the first moment is the time threshold.

For example, the time threshold may be obtained through time-consuming statistical analysis on a task executed by the first process. The time threshold may be set based on an actual situation or experience. A specific value of the time threshold is not limited in this embodiment of this application.

In a possible implementation 2, when the task executed by the first process is completed, the terminal device sets the first process to be adjusted from the second priority to the first priority.

For example, in an example in which the first process is the system UI process, when reconfiguration and drawing performed by the system UI process based on the configuration information are completed, the terminal device may set the first process to be adjusted from the second priority to the first priority.

In a possible implementation 3, when identifying that the inner screen lighting process ends, the terminal device sets the first process to be adjusted from the second priority to the first priority.

The terminal device may identify, when backlight is delivered to light up the screen, that the inner screen lighting process ends, or may identify, when identifying that the terminal device is in a screen-on state, that the inner screen lighting process ends. A condition for identifying that the inner screen lighting process ends is not limited in this embodiment of this application.

It may be understood that the terminal device may control, by using any one of the foregoing three implementations, the time during which the first process has the second priority, or may control, in another implementation, the time during which the first process has the second priority. This is not specifically limited herein.

Based on the foregoing embodiment, the terminal device may further set the first process to be on a big core or a medium core while adjusting the priority of the first process.

Specifically, the terminal device may further adjust the first process from a first CPU core to a second CPU core. When the first CPU core is a little core, the second CPU core is a big core or a medium core. When the first CPU core is a medium core, the second CPU core is a big core.

For example, in an example in which the first process is the system UI process, the terminal device further adjusts the system UI process to be on a big core or a medium core.

In this way, the first process runs on a big core or a medium core that has a good computing power, so as to reduce a case in which the first process runs on a little core that has a poor computing power, so that the first process completes rearrangement and redrawing based on a new configuration with less running time.

In some embodiments, the terminal device may set, within a period of time, the first process to run on a big core or a medium core. It may also be understood that after the first process is adjusted to run on a big core or a medium core, the terminal device cancels the adjustment after a period of time.

For example, the terminal device may set, within a period of time, the system UI process to be adjusted on a big core or a medium core, and cancel the adjustment after a period of time.

In this way, it may be set, within a key time period, that the first process has an affinity for a medium core and a big core, so that the first process runs on a medium core and a big core within a time period during which unfolding from the screen-off folded state triggers the inner screen to light up.

In a possible implementation 1, the affinity adjustment for the first process is cancelled by setting a time threshold. After the terminal device adjusts the first process to run on a big core or a medium core, the terminal device adjusts the first process from the second priority to the first priority after a period of time.

For example, at a first moment, the terminal device sets the first process to run on a big core or a medium core. At a second moment, the terminal device cancels the setting that the first process runs on a big core or a medium core. A difference between the second moment and the first moment is the time threshold.

For example, the time threshold may be obtained through time-consuming statistical analysis on a task executed by the first process. The time threshold may be set based on an actual situation or experience. A specific value of the time threshold is not limited in this embodiment of this application.

In a possible implementation 2, when the task executed by the first process is completed, the terminal device cancels the setting that the first process runs on a big core or a medium core.

For example, in an example in which the first process is the system UI process, when reconfiguration and drawing performed by the system UI process based on the configuration information are completed, the terminal device may cancel the setting that the first process runs on a big core or a medium core.

In a possible implementation 3, when identifying that the inner screen lighting process ends, the terminal device cancels the setting that the first process runs on a big core or a medium core.

The terminal device may identify, when backlight is delivered to light up the screen, that the inner screen lighting process ends, or may identify, when identifying that the terminal device is in a screen-on state, that the inner screen lighting process ends. A condition for identifying that the inner screen lighting process ends is not limited in this embodiment of this application.

It may be understood that the terminal device may control, by using any one of the foregoing three implementations, the time during which the terminal device sets the first process to run on a big core or a medium core, or may control, in another implementation, the time during which the terminal device sets the first process to run on a big core or a medium core. This is not specifically limited herein.

Based on the foregoing embodiment, the terminal device may further adjust a priority of a second process.

In some embodiments, the first process invokes the second process after the first process is adjusted from the first priority to the second priority. The terminal device adjusts the second process from a third priority to the second priority, where the second process is a process invoked in response to the first process.

In this way, the priority of the second process is adjusted to reduce a running wait time of the second process, so that a time during which the first process invokes the second process can be shortened, a waiting time of the first process can be shortened, and a screen-on display time can be shortened, thereby improving user experience.

Based on the foregoing embodiment, the terminal device may further adjust a priority of a third process. The third process has a dependency relationship with the first process.

It may be understood that because the third process has a dependency relationship with the first process, a lock in the third process cannot be eliminated, and lock contention of a granularity cannot be further reduced.

In some embodiments, the terminal device adjusts the third process to the second priority.

For example, in an example in which the first process is the system UI process, the third process may be an android UI process in the system server process.

This may increase an execution speed of a lock holding process, reduce additional waiting overheads generated by the system UI process due to lock contention, and shorten a time consumed by an inner screen display process.

Based on the foregoing embodiment, the terminal device may further delete a lock in a fourth process, or reduce a granularity of a lock related to the fourth process.

The fourth process may be the first process, or may be another process that uses a same lock as the first process. This is not limited herein.

It may be understood that a process in the terminal device may enter a sleeping state (sleeping) due to reasons such as waiting for a lock and a semaphore. Therefore, the terminal device deletes some locks to increase an execution speed of the lock holding process, thereby shortening a sleep time of a process in the terminal device, and further shortening a time consumed by an inner screen display process.

The following describes the display method provided in an embodiment of this application with reference to a specific example.

For example, FIG. 6 is a schematic flowchart of a display method according to an embodiment of this application. In an example in which the first process is the system UI process, the display method includes.

In a process in which the terminal device switches from a screen-off folded state to an unfolded state, the terminal device detects that an included angle of a foldable screen is greater than or equal to a first threshold, and triggers a screen-on process.

Specifically, a Hall sensor in the terminal device detects that the included angle of the foldable screen is greater than or equal to the first threshold. Adaptively, the terminal device reports a far-away event to a sensor manager through a sensor driver and sensor hardware abstraction, and triggers a screen-on display process.

S601: A foldable screen manager in a system server process of the terminal device identifies an unfolding event of a screen-off folded state based on a far-away event.

In this embodiment of this application, the unfolding event of the screen-off folded state is an unfolding event identified when the terminal device is in the screen-off folded state.

S602: The foldable screen manager in the system server process distributes the unfolding event of the screen-off folded state to a system UI process.

After receiving the far-away event, the foldable screen manager determines that the terminal device is in the screen-off state, and identifies the unfolding event of the screen-off folded state. The system server process distributes the unfolding event of the screen-off folded state.

S603: The system UI process receives the unfolding event of the screen-off folded state.

S604: The system UI process obtains identification information of the system UI process after receiving the unfolding event of the screen-off folded state.

S605: The system UI process sends the identification information of the system UI process to the system server process. Adaptively, the system server process receives the identification information of the system UI process.

S606: The system server process adjusts the system UI process from a first priority to a second priority based on the identification information.

For the first priority and the second priority, refer to the description of the related content in S503 Details are not described herein again.

In this way, a priority of the system UI process is adjusted, so that the system UI process is preferentially scheduled to run, thereby reducing a time percentage of the system UI process in a runnable (runnable) state, and increasing a percentage of the system UI process in a running (running) state.

In conclusion, this may shorten a waiting time during which the system UI process is not scheduled due to reasons such as a low priority, thereby increasing a running speed; reduce a time percentage of the system UI process in a runnable (runnable) state and increase a percentage of the system UI process in a running (running) state, thereby shortening a screen-on display time; adjust the priority of the system UI process, thereby shortening a time during which the screen-on process obtains a CPU resource, and further reducing the time percentage of the system UI process in the runnable state.

Based on the foregoing embodiment shown in FIG. 6, the terminal device may further set the system UI process to be on a big core or a medium core while adjusting the priority of the system UI process.

In a possible implementation, the terminal device further performs S607.

S607: The system server process adjusts the system UI process to be on a big core or a medium core based on the identification information.

Specifically, the terminal device may further adjust the system UI process from a first CPU core to a second CPU core. When the first CPU core is a little core, the second CPU core is a big core or a medium core. When the first CPU core is a medium core, the second CPU core is a big core.

It may be understood that the system server process sets, based on the identification information, the system UI process to run on a big core or a medium core.

In this way, the system UI process runs on a big core or a medium core that has a good computing power, so as to reduce a case in which the system UI process runs on a little core that has a poor computing power, so that the system UI process completes rearrangement and redrawing based on a new configuration with less running time.

Based on the foregoing embodiment shown in FIG. 6, the terminal device further performs S608.

S608: After a period of time, the terminal device cancels the priority adjustment for the first process and/or the affinity adjustment for the first process.

It may be understood that, if the terminal device adjusts the priority of the first process, the terminal device cancels the priority adjustment for the first process after a period of time. If the terminal device adjusts the affinity of the first process, the terminal device cancels the affinity adjustment for the first process after a period of time.

The priority adjustment means adjusting the first process from the first priority to the second priority. The affinity adjustment means setting the first process to run on a big core or a medium core.

The following describes the cancellation of the priority adjustment for the first process.

The terminal device adjusts the system UI process from the first priority to the second priority, and after a period of time, adjusts the system UI process from the second priority to the first priority.

In this way, the first process is preferentially scheduled in a key time period, so as to shorten a screen-on display time. In addition, interference to subsequent display or another function may be reduced.

In a possible implementation 1, a time threshold is set, and upon expiration of the time threshold, the first process is adjusted from the second priority to the first priority.

For example, at a first moment, the system server process adjusts the system UI process from the first priority to the second priority. At a second moment, the system server process adjusts the system UI process from the second priority to the first priority. A difference between the second moment and the first moment is the time threshold.

For example, the time threshold may be obtained through time-consuming statistical analysis on a task executed by the first process. The time threshold may be set based on an actual situation or experience. A specific value of the time threshold is not limited in this embodiment of this application.

In a possible implementation 2, when the task executed by the system UI process is completed, the terminal device sets the first process to be adjusted from the second priority to the first priority.

When reconfiguration and drawing performed by the system UI process based on the configuration information are completed, the terminal device may set the first process to be adjusted from the second priority to the first priority.

In a possible implementation 3, when identifying that the inner screen lighting process ends, the terminal device sets the system UI process to be adjusted from the second priority to the first priority.

The terminal device may identify, when backlight is delivered to light up the screen, that the inner screen lighting process ends, or may identify, when identifying that the terminal device is in a screen-on state, that the inner screen lighting process ends. A condition for identifying that the inner screen lighting process ends is not limited in this embodiment of this application.

It may be understood that the terminal device may control, by using any one of the foregoing three implementations, the time during which the first process has the second priority, or may control, in another implementation, the time during which the first process has the second priority. This is not specifically limited herein.

It may be understood that, for the cancellation of the affinity adjustment for the first process, refer to the foregoing description of the corresponding content in FIG. 5, or refer to the related content about the cancellation of the priority adjustment for the first process. Details are not described herein again.

In this way, it may be set, within a key time period, that the first process has an affinity for a medium core and a big core, so that the first process runs on a medium core and a big core within a time period during which unfolding from the screen-off folded state triggers the inner screen to light up.

Based on the foregoing embodiment, the terminal device further performs S609.

S609: The system server process adjusts the android UI process to the second priority.

It may be understood that the android UI process has a lock contention relationship with the system UI process.

This may reduce additional waiting overheads generated by the system UI process due to lock contention, and shorten a time consumed by an inner screen display process.

Based on the foregoing embodiment, the terminal device may further delete a lock in a fourth process, or reduce a granularity of a lock related to the fourth process.

The fourth process may be the first process, or may be another process that uses a same lock as the first process. This is not limited herein.

It may be understood that a process in the terminal device may enter a sleeping state (sleeping) due to reasons such as waiting for a lock and a semaphore. Therefore, the terminal device deletes some locks to shorten a sleep time of a process in the terminal device, and further shorten a time consumed by an inner screen display process.

Figure 7A:
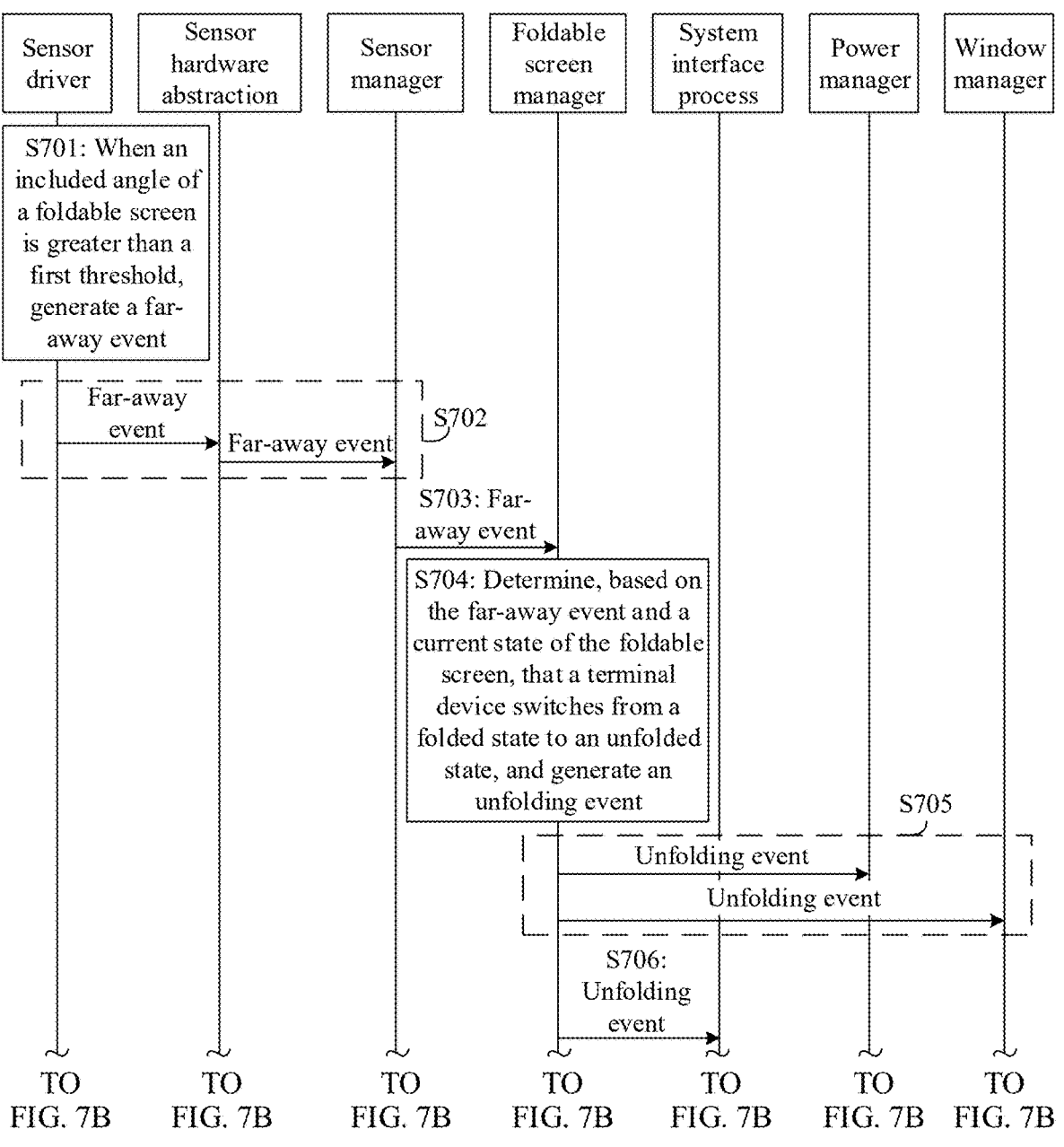
FIG. 7A and FIG. 7B are schematic flowcharts of interaction between internal modules of a terminal device according to an embodiment of this application.
Figure 7B:
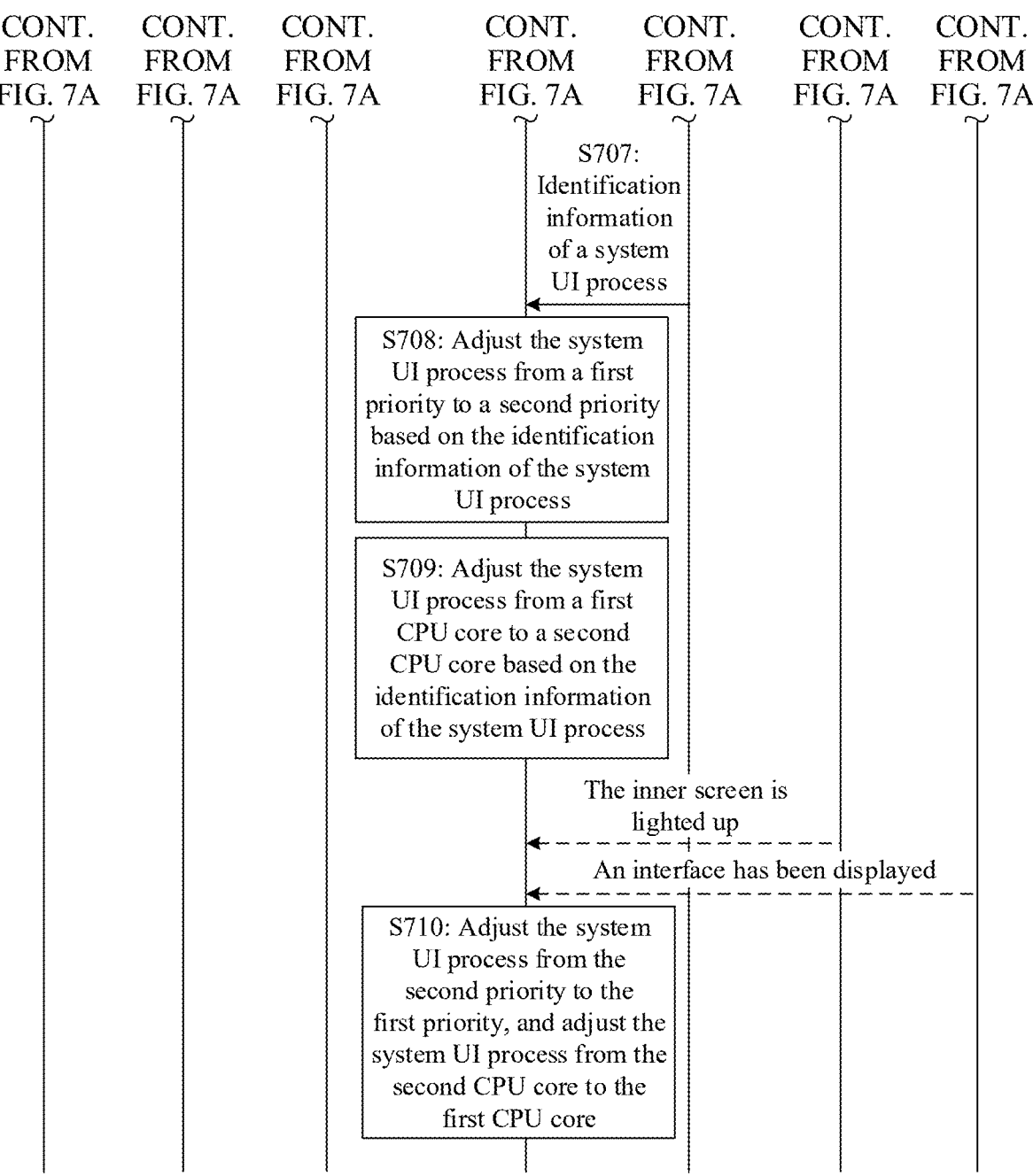

The following describes a process of interaction between internal modules of the terminal device with reference to FIG. 7A and FIG. 7B. As shown in FIG. 7A and FIG. 7B, the terminal device includes a sensor driver, sensor hardware abstraction, a sensor manager, a foldable screen manager, a system interface process, a power manager, and a window manager. In an example in which an included angle of the terminal device changes from 0 degrees, the interaction process includes:

S701: After an included angle of a foldable screen is greater than a first threshold, the sensor driver generates a far-away event based on a signal transmitted by a Hall sensor.

S702: The sensor driver reports the far-away event to the sensor manager through the sensor hardware abstraction.

S703: After receiving the far-away event, the sensor manager distributes the far-away event to the foldable screen manager.

S704: The foldable screen manager determines, based on the far-away event and a current state of the foldable screen, that the terminal device switches from a folded state to an unfolded state, and generates an unfolding event.

S705: The foldable screen manager distributes the unfolding event to the power manager and the window manager.

S706: The foldable screen manager sends the unfolding event to a system UI process.

It may be understood that the terminal device may perform S705 and S706 simultaneously, or may perform S705 before S706. A sequence of performing S705 and S706 by the terminal device is not limited in this embodiment of this application.

S707: After receiving the unfolding event, the system UI process sends identification information of the system UI process to the foldable screen manager.

S708: The foldable screen manager adjusts the system UI process from a first priority to a second priority based on the identification information of the system UI process.

S709: The foldable screen manager adjusts the system UI process from a first CPU core to a second CPU core based on the identification information of the system UI process.

It may be understood that the terminal device may perform S708 and S709 simultaneously, or may perform S708 before S709. A sequence of performing S708 and S709 by the terminal device is not limited in this embodiment of this application.

S710: After receiving a first message, the foldable screen manager cancels priority adjustment and affinity adjustment for the system UI process.

The first message is used to indicate that an inner screen display process ends. The first message may include one or more of the following: a message from the power manager indicating that an inner screen is lighted up; and a message from the window manager indicating that an interface has been displayed. This is not limited herein.

Specifically, after receiving the first message, the foldable screen manager adjusts the system UI process from the second priority to the first priority, and adjusts the system UI process from the second CPU core to the first CPU core.

It may be understood that the foldable screen manager may further cancel the priority adjustment and the affinity adjustment for the system UI process upon expiration of a preset time interval after the system UI process is adjusted from the first priority to the second priority. The preset time interval may be the foregoing time threshold, and details are not described herein again.

Alternatively, after receiving a message indicating that running of the system UI process is completed, the foldable screen manager cancels the priority adjustment and the affinity adjustment for the system UI process.

In some embodiments, the foldable screen manager may further adjust a priority and affinity of an android UI process. For a specific adjustment manner, refer to the adjustment for the system UI process in S707-S710. Details are not described herein again.

Adaptively, after receiving the unfolding event, the android UI process sends identification information of the android UI process to the foldable screen manager.

This may shorten a waiting time during which the system UI process is not scheduled due to reasons such as a low priority, thereby increasing a running speed; reduce a time percentage of the system UI process in a runnable (runnable) state and increase a percentage of the system UI process in a running (running) state, thereby shortening a screen-on display time, adjust the priority of the system UI process, thereby shortening a time during which the screen-on process obtains a CPU resource, and further reducing the time percentage of the system UI process in the runnable state.

In the foregoing embodiments shown in FIG. 6 and FIG. 7A and FIG. 7B, the system UI process needs to obtain the identification information of the system UI process and notify a system server process of the identification information of the system UI process across processes. This may increase system load and scheduling overheads. In addition, the method shown in FIG. 6 depends on precise scenario detection and cross-process notification of the system server process, such as invoking Binder of Android. However, adding inter-process communication in this scenario increases system load, and a time consumed depends on timeliness of scheduling.

An embodiment of this application provides another display method, so as to locally pre-store the identification information of the system UI process. In this way, the system server process obtains the identification information without requiring inter-process communication, thereby reducing communication load and enhancing timeliness guarantee.

For example, FIG. 8 is a schematic flowchart of another display method according to an embodiment of this application. In an example in which the first process is the system UI process, the display method includes:

In a process in which the terminal device switches from a screen-off folded state to an unfolded state, the terminal device detects that an included angle of a foldable screen is greater than or equal to a first threshold, and triggers a screen-on process.

Specifically, a Hall sensor in the terminal device detects that the included angle of the foldable screen is greater than or equal to the first threshold. Adaptively, the terminal device reports a far-away event to a sensor manager through a sensor driver and sensor hardware abstraction, and triggers a screen-on display process.

S801: A foldable screen manager in a system server process of the terminal device identifies an unfolding event of a screen-off folded state based on a far-away event.

S802: The system server process adjusts the system UI process from a first priority to a second priority based on the pre-stored identification information of the system UI process.

In this way, the priority of the system UI process is adjusted, thereby shortening a time during which the screen-on process obtains a CPU resource, and further reducing a time percentage of the system UI process in a waiting (runnable) state.

Compared with the method shown in FIG. 6, in the method shown in FIG. 8, the foldable screen manager in the system server process detects the scenario, and may obtain corresponding information from a local cache, so that the identification information is obtained without requiring inter-process communication, thereby reducing communication load and enhancing timeliness guarantee.

Based on the foregoing embodiment, the terminal device further performs S803-S805 to store the identification information of the system UI in the local cache.

S803: During startup, the system server process registers monitoring of a database write event.

S804: During startup, the system UI process writes identification information of the system UI into a database.

S805: The system server detects that the identification information of the system UI is written into the database, and reads the identification information of the system UI and stores the identification information of the system UI in the local cache.

This may reduce repeated reading of the database.

In some embodiments, if the system UI process is restarted for some reason, during the restart of the system UI process, the database is rewritten, and a mechanism for monitoring and updating the local cache of the system server is triggered, so as to ensure data consistency. For the restart of the system server for some reason, the Android framework triggers an entire Android restart. In this case, actions of registering the monitoring, writing the identification information, detecting a write event, and storing the identification information in the local cache are performed again, so as to ensure data consistency.

It may be understood that the terminal device may alternatively store the identification information of the system UI in the local cache in another manner. This is not limited herein.

Based on the foregoing embodiment shown in FIG. 8, the terminal device may further set the system UI process to be on a big core or a medium core while adjusting the priority of the system UI process.

Specifically, the terminal device may further adjust the system UI process from a first CPU core to a second CPU core. When the first CPU core is a little core, the second CPU core is a big core or a medium core. When the first CPU core is a medium core, the second CPU core is a big core.

In a possible implementation, the terminal device further performs S806.

S806: The system server process adjusts the system UI process to be on a big core or a medium core based on the identification information.

It may be understood that the system server process sets, based on the identification information, the system UI process to run on a big core or a medium core.

In this way, the system UI process runs on a big core or a medium core that has a good computing power, so as to reduce a case in which the system UI process runs on a little core that has a poor computing power, so that the system UI process completes rearrangement and redrawing based on a new configuration with less running time.

Based on the foregoing embodiment shown in FIG. 8, the terminal device further performs S807.

S807: After a period of time, the terminal device cancels the priority adjustment for the first process and/or the affinity adjustment for the first process.

For a specific manner of S807, refer to the foregoing corresponding description of S608. Details are not described herein again.

Based on the foregoing embodiment, the terminal device further performs S808.

S808: The system server process adjusts the android UI process to the second priority.

It may be understood that the android UI process has a lock contention relationship with the system UI process.

This may reduce additional waiting overheads generated by the system UI process due to lock contention, and shorten a time consumed by an inner screen display process.

Based on the foregoing embodiment, the terminal device may further delete a lock in a fourth process, or reduce a granularity of a lock related to the fourth process.

The fourth process may be the first process, or may be another process that uses a same lock as the first process. This is not limited herein.

It may be understood that a process in the terminal device may enter a sleeping state (sleeping) due to reasons such as waiting for a lock and a semaphore. Therefore, the terminal device deletes some locks to shorten a sleep time of a process in the terminal device, and further shorten a time consumed by an inner screen display process.

Figure 9A:
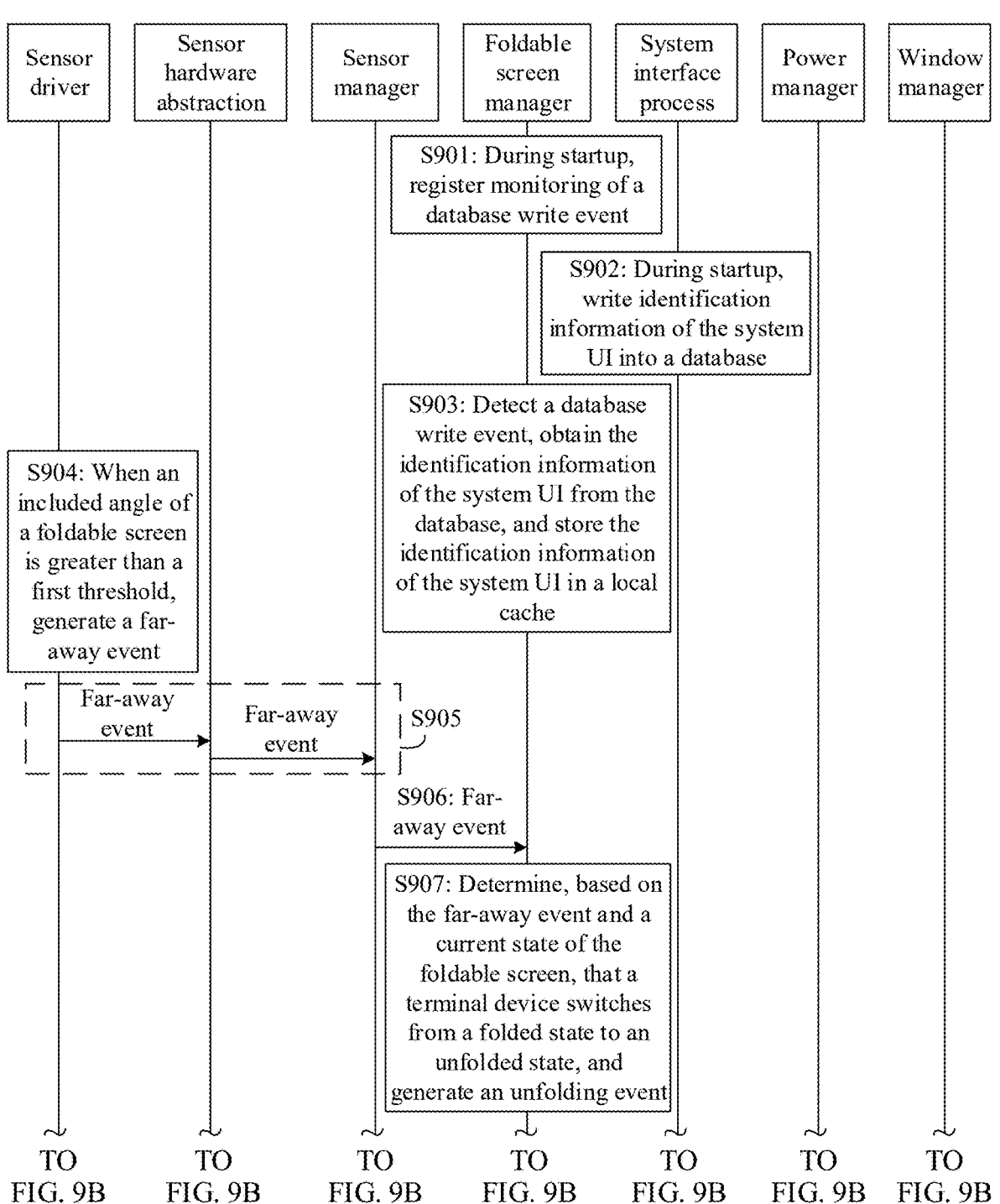
FIG. 9A and FIG. 9B are schematic flowcharts of interaction between internal modules of a terminal device according to an embodiment of this application.
Figure 9B:
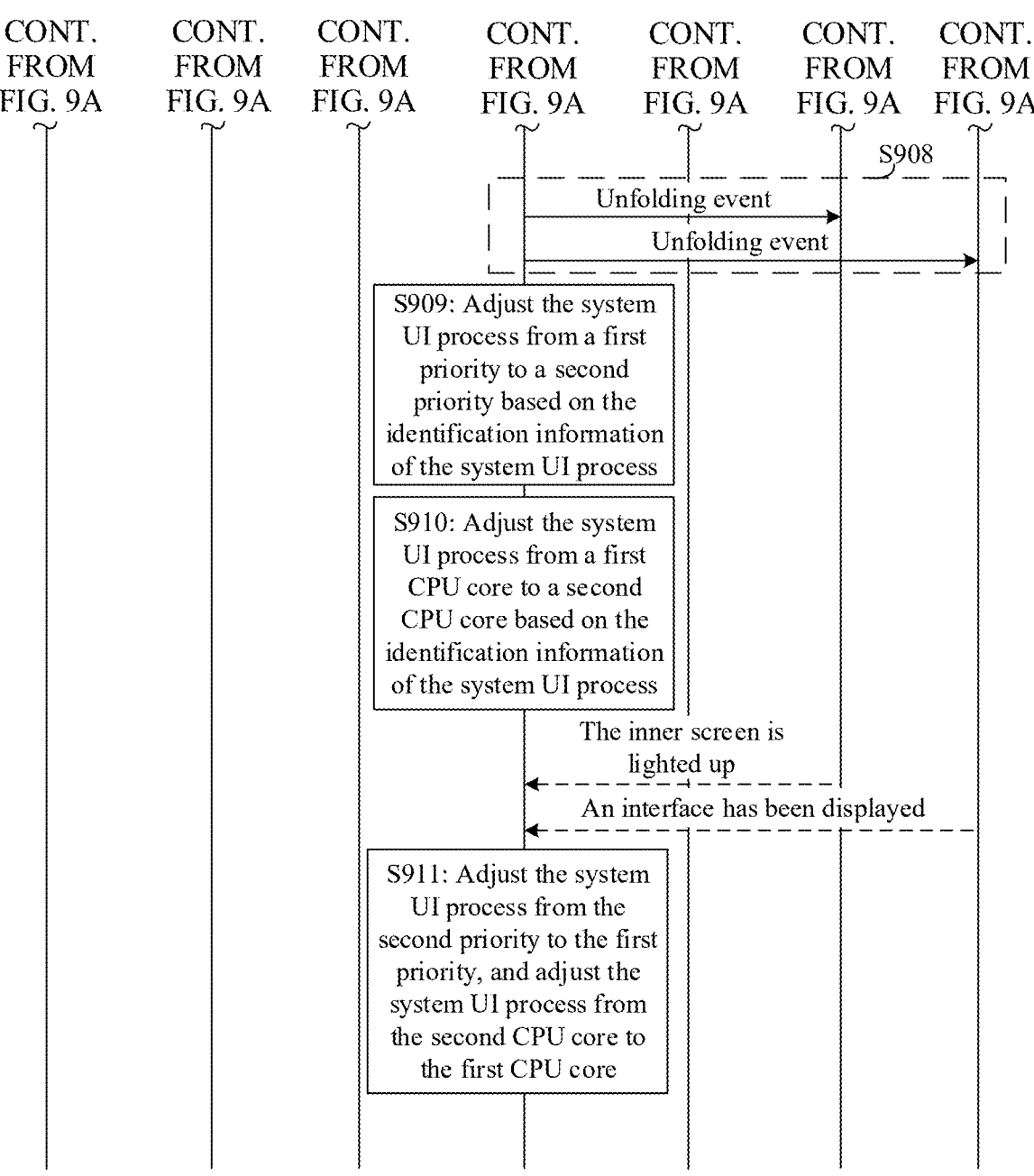

The following describes a process of interaction between internal modules of the terminal device with reference to FIG. 9A and FIG. 9B. As shown in FIG. 9A and FIG. 9B, the terminal device includes a sensor driver, sensor hardware abstraction, a sensor manager, a foldable screen manager, a system interface process, a power manager, and a window manager.

In an example in which an included angle of the terminal device changes from 0 degrees, the interaction process includes:

S901: During startup, the foldable screen manager registers monitoring of a database write event.

S902: During startup, the system UI process writes identification information of the system UI into a database.

S903: The system server process detects a database write event, obtains the identification information of the system UI from the database, and stores the identification information of the system UI in a local cache.

S904: After an included angle of a foldable screen is greater than a first threshold, the sensor driver generates a far-away event based on a signal transmitted by a Hall sensor.

S905: The sensor driver reports the far-away event to the sensor manager through the sensor hardware abstraction.

S906: After receiving the far-away event, the sensor manager distributes the far-away event to the foldable screen manager.

S907: The foldable screen manager determines, based on the far-away event and a current state of the foldable screen, that the terminal device switches from a folded state to an unfolded state, and generates an unfolding event.

S908: The foldable screen manager distributes the unfolding event to the power manager and the window manager.

S909: The foldable screen manager adjusts the system UI process from a first priority to a second priority based on the identification information of the system UI process.

S910: The foldable screen manager adjusts the system UI process from a first CPU core to a second CPU core based on the identification information of the system UI process.

It may be understood that the terminal device may perform S909 and S910 simultaneously, or may perform S909 before S910. A sequence of performing S909 and S910 by the terminal device is not limited in this embodiment of this application.

S911: After receiving a first message, the foldable screen manager cancels priority adjustment and affinity adjustment for the system UI process.

The first message is used to indicate that an inner screen display process ends. The first message may include one or more of the following: a message from the power manager indicating that an inner screen is lighted up; and a message from the window manager indicating that an interface has been displayed. This is not limited herein.

Specifically, after receiving the first message, the foldable screen manager adjusts the system UI process from the second priority to the first priority, and adjusts the system UI process from the second CPU core to the first CPU core.

It may be understood that the foldable screen manager may further cancel the priority adjustment and the affinity adjustment for the system UI process upon expiration of a preset time interval after the system UI process is adjusted from the first priority to the second priority. The preset time interval may be the foregoing time threshold, and details are not described herein again.

Alternatively, after receiving a message indicating that running of the system UI process is completed, the foldable screen manager cancels the priority adjustment and the affinity adjustment for the system UI process.

In some embodiments, the foldable screen manager may further adjust a priority and affinity of an android UI process. For details, refer to related processing and adjustment for the system UI process in S902, S903, and S909-S911. Details are not described herein again.

This may shorten a waiting time during which the system UI process is not scheduled due to reasons such as a low priority, thereby increasing a running speed; reduce a time percentage of the system UI process in a runnable (runnable) state and increase a percentage of the system UI process in a running (running) state, thereby shortening a screen-on display time; adjust the priority of the system UI process, thereby shortening a time during which the screen-on process obtains a CPU resource, and further reducing the time percentage of the system UI process in the runnable state.

It may be understood that, in the foregoing embodiments, a scenario in which the terminal device is switched from the screen-off folded state to the unfolded state is identified, and a priority, affinity, and the like of a related process in the scenario are adjusted, thereby shortening a time consumed for lighting up the inner screen of the terminal device for display. The terminal device may further identify another scenario, and adjust a priority, affinity, and the like of a related process in a corresponding scenario, thereby shortening a waiting time during which a process is not scheduled due to reasons such as a low priority, increasing a running speed, and improving user experience. The another scenario may be switching from the unfolded state to the folded state, switching from the screen-on folded state to the unfolded state, or the like. This is not limited herein.

It should be noted that, the foregoing embodiments are all described by using an example in which the foldable screen of the terminal device implements two folds on the left side and the right side, and the terminal device includes two states: the folded state and the unfolded state. In a possible implementation, the foldable screen may alternatively be a foldable screen (not shown in the figure) that can implement three folds, four folds, or the like. The status of the terminal device may alternatively include the folded state, a transition state, and the unfolded state.

For example, the foldable screen may be a foldable screen that implements N folds, where N is an integer greater than or equal to 2.

It should be noted that in the embodiments of this application, "when . . . " may be an instantaneous occurrence time of a case, or may be a period of time after occurrence of a case, and this is not specifically limited in the embodiments of this application. In addition, a display interface provided in the embodiments of this application is merely an example, and the display interface may further include more or less content.

The display method in the embodiments of this application is described above. An apparatus for performing the display method provided in the embodiments of this application is described below. It may be understood by a person skilled in the art that the method and the apparatus may be combined with or refer to each other. The terminal device provided in the embodiments of this application may perform the steps of the foregoing display method.

Figure 10:
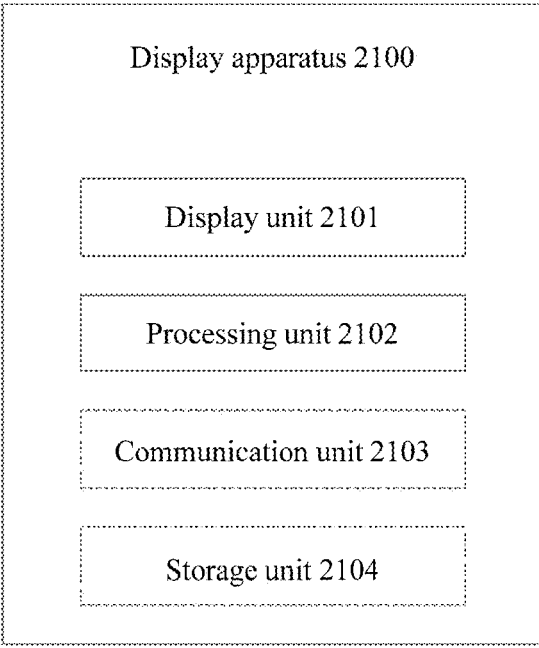
FIG. 10 is a schematic diagram of a structure of a display apparatus according to an embodiment of this application.

FIG. 10 is a schematic diagram of a structure of a display apparatus according to an embodiment of this application. The display apparatus may be the terminal device in the embodiments of this application, or may be a chip or a chip system in the terminal device.

As shown in FIG. 10, a display apparatus 2100 may be applied to a communication device, a circuit, a hardware component, or a chip, and the display apparatus includes a display unit 2101 and a processing unit 2102. The display unit 2101 is configured to support the display apparatus 2100 in performing a display step. The processing unit 2102 is configured to support the display apparatus 2100 in performing an information processing step.

In a possible implementation, the display apparatus 2100 may further include a communication unit 2103. Specifically, the communication unit is configured to support the display apparatus 2100 in performing a data sending step and a data receiving step. The communication unit 2103 may be an input or output interface, a pin, a circuit, or the like.

In a possible embodiment, the display apparatus may further include a storage unit 2104. The processing unit 2102 and the storage unit 2104 are connected to each other by using a line. The storage unit 2104 may include one or more memories, and the memory may be one or more components that are in a device or a circuit and that are configured to store a program or data. The storage unit 2104 may exist independently, and is connected to the processing unit 2102 of the display apparatus by using a communication line. Alternatively, the storage unit 2104 may be integrated into the processing unit 2102.

The storage unit 2104 may store computer-executable instructions of the method in the terminal device, so that the processing unit 2102 performs the method in the foregoing embodiments. The storage unit 2104 may be a register, a cache, a RAM, or the like, and the storage unit 2104 may be integrated into the processing unit 2102. The storage unit 2104 may be a read-only memory (read-only memory, ROM) or another type of static storage device that may store static information and instructions. The storage unit 2104 may be independent of the processing unit 2102.

The display method provided in the embodiments of this application may be applied to an electronic device that has a foldable screen. The electronic device includes the terminal device. For a specific device form and the like of the terminal device, refer to the foregoing related description. Details are not described herein again.

Figure 11:
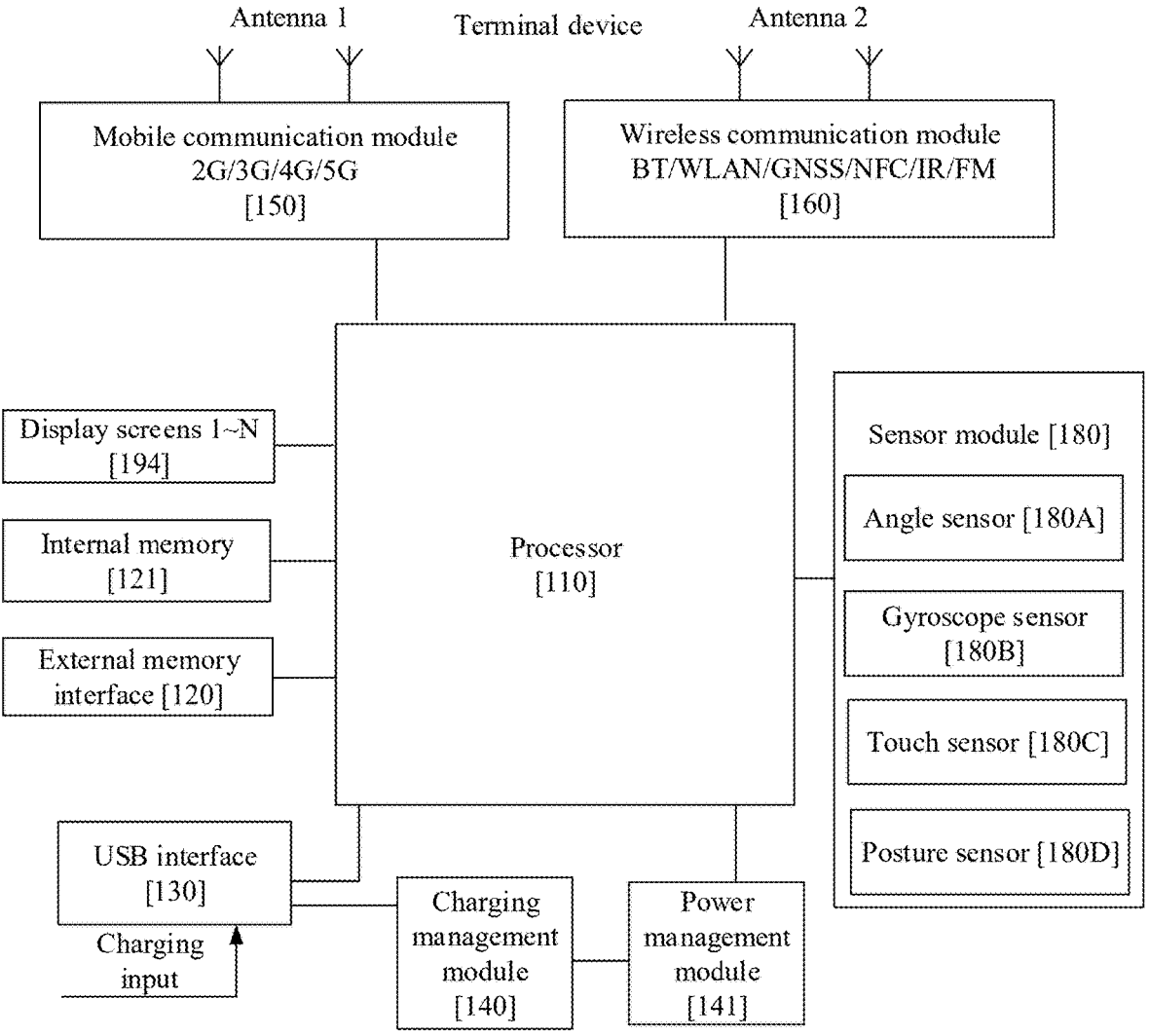
FIG. 11 is a schematic diagram of a structure of a terminal device according to an embodiment of this application.

For example, FIG. 11 is a schematic diagram of a structure of a terminal device according to an embodiment of this application. The terminal device may include a processor 110, an external memory interface 120, an internal memory 121, a universal serial bus (universal serial bus, USB) interface 130, a charging management module 140, a power management module 141, an antenna 1, an antenna 2, a mobile communication module 150, a wireless communication module 160, a sensor module 180, a display screen 194, and the like. The sensor module 180 may include at least an angle sensor 180A, a gyroscope sensor 180B, a touch sensor 180C, a posture sensor 180D, and the like.

It may be understood that the structure shown in the embodiments of this application does not constitute a specific limitation on the terminal device. In some other embodiments of this application, the terminal device may include more or fewer components than those shown in the figure, or combine some components, or split some components, or have different component arrangements. The components shown in the figure may be implemented by using hardware, software, or a combination of software and hardware.

The processor 110 may include one or more processing units. Different processing units may be independent components, or may be integrated into one or more processors. A memory may be further disposed in the processor 110 to store instructions and data.

The USB interface 130 is an interface that complies with USB standard specifications, and may be specifically a Mini USB interface, a Micro USB interface, a USB Type C interface, or the like. The USB interface 130 may be configured to be connected to a charger to charge the terminal device, may be configured to transmit data between the terminal device and a peripheral device, or may be configured to be connected to a headset to play audio through the headset. The interface may alternatively be configured to be connected to another electronic device, for example, an AR device.

The charging management module 140 is configured to receive a charging input from a charger. The charger may be a wireless charger or a wired charger. The power management module 141 is configured to be connected to the charging management module 140 and the processor 110.

A wireless communication function of the terminal device may be implemented by using the antenna 1, the antenna 2, the mobile communication module 150, the wireless communication module 160, a modem processor, a baseband processor, and the like.

The antenna 1 and the antenna 2 are configured to transmit and receive electromagnetic wave signals. The antenna in the terminal device may be configured to cover one or more communication bands. Different antennas may be further multiplexed to improve antenna utilization.

The mobile communication module 150 may provide a solution for wireless communication that is applied to the terminal device and that includes 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and transmit a processed electromagnetic wave to the modem processor for demodulation.

The wireless communication module 160 may provide a solution for wireless communication that is applied to the terminal device and that includes a wireless local area network (wireless local area networks. WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), and the like.

The terminal device implements a display function by using the GPU, the display screen 194, the application processor, and the like. The GPU is a microprocessor for image processing and is connected to the display screen 194 and the application processor. The GPU is configured to perform mathematical and geometric calculation for graphics rendering.

The display screen 194 is configured to display an image, a video, and the like. The display screen 194 includes a display panel. In some embodiments, the terminal device may include 1 or N display screens 194, where N is a positive integer greater than 1. In the embodiments of this application, the display screen 194 may be a foldable screen, a large screen, or the like.

In some embodiments, the foldable screen may be a foldable screen that can implement two folds, three folds, four folds, or the like, and the foldable screen may alternatively be a foldable screen (not shown in the figure) that can implement three folds, four folds, or the like. For example, the foldable screen is a foldable screen that can implement two folds on the left side and the right side.

A status of the foldable screen may include a folded state and an unfolded state. The status of the foldable screen may alternatively include the folded state, a transition state, and the unfolded state.

In some embodiments, the display screen 194 may alternatively be an outer screen of the terminal device. For understanding of the outer screen, refer to the description of the outer screen in the foregoing embodiments. Details are not described herein again. In some embodiments, the display screen 194 may alternatively be an inner screen of the terminal device. For understanding of the inner screen, refer to the description of the inner screen in the foregoing embodiments. Details are not described herein again.

The external memory interface 120 may be configured to be connected to an external storage card such as a Micro SD card, to expand a storage capability of the terminal device. The external storage card communicates with the processor 110 by using the external memory interface 120, to implement a data storage function, for example, to store files such as music and videos in the external storage card.

The internal memory 121 may be configured to store computer-executable program code, and the executable program code includes instructions. The internal memory 121 may include a program storage area and a data storage area.

The angle sensor 180A is configured to measure an angle. In the embodiments of this application, when the terminal device is a mobile phone with a foldable screen, the angle sensor 180A is configured to determine a folding angle of the mobile phone with a foldable screen. The angle sensor 180A may be a Hall sensor.

The gyroscope sensor 180B may be configured to determine a motion posture of the terminal device. In the embodiments of this application, the gyroscope sensor 180B may be configured to determine a landscape state of the terminal device or a portrait state of the terminal device. When the terminal device is a mobile phone with a foldable screen, the gyroscope sensor 180B may alternatively be configured to determine an upper half screen or a lower half screen of the mobile phone with a foldable screen.

The touch sensor 180C may be disposed on the display screen 194. The touch sensor 180C and the display screen 194 form a touchscreen, also referred to as a "touch control screen".

In the embodiments of this application, the touch sensor 180C is configured to receive a touch operation performed by a user on the touchscreen, for example, receive a triggering operation that is performed by the user to enable a video application, a triggering operation that is performed by the user to enable a short video application, or a triggering operation that is specific to a function control in the application.

The posture sensor 180D is configured to monitor a posture of the terminal device. An embodiment of this application provides an electronic device, and the electronic device includes a processor and a memory. The memory stores computer-executable instructions. The processor executes the computer-executable instructions stored in the memory, to enable the electronic device to perform the foregoing method.

An embodiment of this application provides a chip. The chip includes a processor, and the processor is configured to invoke a computer program in a memory to execute the technical solutions in the foregoing embodiments. The implementation is similar to the foregoing related embodiments in terms of implementation principles and technical effects. Details are not described herein again.

An embodiment of this application further provides a computer-readable storage medium. The computer-readable storage medium stores a computer program. The foregoing method is implemented when the computer program is executed by a processor. The method described in the foregoing embodiments may be completely or partially implemented by using software, hardware, firmware, or any combination thereof. If implemented in software, functions may be stored in a computer-readable medium or transmitted on a computer-readable medium as one or more instructions or code. The computer-readable medium may include a computer storage medium and a communication medium, and may further include any medium that enables a computer program to be transmitted from a place to another place. The storage medium may be any target medium accessible by a computer.

In a possible implementation, the computer-readable medium may include a RAM, a ROM, a compact disc read-only memory (compact disc read-only memory, CD-ROM) or another optical disc memory, a magnetic disk memory or another magnetic storage device, or any other medium that is to carry or store required program code in a form of an instruction or a data structure, and may be accessed by a computer. In addition, any connection is appropriately referred to as a computer-readable medium. For example, if software is transmitted from a website, a server, or another remote source by using a coaxial cable, an optical fiber cable, a twisted pair, a digital subscriber line (digital subscriber line, DSL), or wireless technologies (such as infrared, radio, and microwave), the coaxial cable, the optical fiber cable, the twisted pair, the DSL, or the wireless technologies such as infrared, radio, and microwave are included in the definition of the medium. As used herein, a magnetic disk and an optical disc include a compact disc, a laser disc, an optical disc, a digital versatile disc (digital versatile disc, DVD), a floppy disk, and a Blu-ray disc. The magnetic disk usually reproduces data in a magnetic manner, and the optical disc reproduces data optically by using a laser. A combination of the foregoing should also be included in the scope of the computer-readable medium.

An embodiment of this application provides a computer program product. The computer program product includes a computer program, and when the computer program is run, a computer is enabled to perform the foregoing method.

The embodiments of this application are described with reference to the flowcharts and/or block diagrams of the method, the device (system), and the computer program product according to the embodiments of this application. It should be understood that computer program instructions may be used to implement each flow and/or each block in the flowcharts and/or the block diagrams and a combination of a flow and/or a block in the flowcharts and/or the block diagrams. These computer program instructions may be provided to a general-purpose computer, a special-purpose computer, an embedded processor, or a processing unit of another programmable device to generate a machine, so that the instructions executed by the computer or the processing unit of the another programmable data processing device generate an apparatus for implementing a specific function in one or more flows in the flowcharts and/or in one or more blocks in the block diagrams.

It should be noted that user information (including but not limited to user equipment information, user personal information, and the like) and data (including but not limited to data used for analysis, stored data, displayed data, and the like) involved in this application are all information and data that are authorized by the user or that are fully authorized by each party. In addition, collection, use, and processing of the related data need to comply with relevant laws, regulations, and standards, and a corresponding operation entry is provided for the user to choose to authorize or reject.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions in the present invention shall fall within the protection scope of the present invention.

The invention claimed is:

1. A display method, applied to a terminal device, wherein the terminal device comprises an outer display screen and an inner display screen, a status of the terminal device comprises a folded state and an unfolded state, and the method comprises:

identifying, by the terminal device, an unfolding event when the terminal device is in the folded state and the outer display screen is off, wherein the unfolding event is used to indicate the terminal device to switch from the folded state to the unfolded state;

obtaining, by the terminal device when identifying the unfolding event, identification information of a first process, wherein the first process is a process that is in the terminal device and that is related to display of the inner display screen;

adjusting, by the terminal device, a scheduling priority of the first process from a first priority to a second priority based on the identification information of the first process, wherein the second priority is higher than the first priority, and wherein the scheduling priority determines an order in which a processor of the terminal device schedules processes for execution;

scheduling, by the terminal device based on the second priority, the first process for running; and lighting up, by the terminal device after running of the first process is completed, the inner display screen, and displaying an interface on the inner display screen.

2. The method according to claim 1, wherein the obtaining, by the terminal device when identifying the unfolding event, identification information of a first process comprises:

obtaining, by the terminal device, the identification information of the first process when invoking the first process.

3. The method according to claim 1, wherein the obtaining, by the terminal device when identifying the unfolding event, identification information of a first process comprises:

reading, by the terminal device when identifying the unfolding event, the identification information of the first process from a local cache;

before the identifying, by the terminal device, an unfolding event when the terminal device is in a screen-off folded state, the method further comprises:

writing, by the terminal device, the identification information of the first process into a database when the first process is started; and storing, by the terminal device, the identification information of the first process in the local cache when the terminal device detects that the identification information of the first process is written into the database.

4. The method according to claim 1, wherein the first process comprises a system interface process, and the system interface process is used to draw the interface.

5. The method according to claim 4, wherein the first process is the system interface process; and the adjusting, by the terminal device, the first process from the second priority to the first priority comprises:

adjusting, by the terminal device, the first process from the second priority to the first priority when the first process completes drawing of the interface.

6. The method according to claim 1, wherein after running of the first process is completed, the method further comprises:

adjusting, by the terminal device, the first process from the second priority to the first priority.

7. The method according to claim 1 wherein the method further comprises:

adjusting the first process from the second priority to the first priority upon expiration of a preset time interval after the first process is adjusted from the first priority to the second priority.

8. The method according to claim 1, wherein the method further comprises:

adjusting, by the terminal device, the first process from the second priority to the first priority when the inner display screen is lighted up.

9. The method according to claim 1, wherein a processor CPU of the terminal device comprises a plurality of cores, and the method further comprises:

adjusting, by the terminal device, the first process from a first CPU core to a second CPU core, wherein a computing capability of the second CPU core is greater than a computing capability of the first CPU core.

10. The method according to claim 1, wherein the method further comprises:

invoking, by the first process, a second process after the first process is adjusted from the first priority to the second priority; and adjusting, by the terminal device, the second process from a third priority to the second priority, wherein the second process is a process invoked in response to the first process; and adjusting, by the terminal device, a third process from a fourth priority to the second priority, wherein the third process has a dependency relationship with the first process; and deleting, by the terminal device, a lock in a fourth process, wherein the fourth process is the first process, and/or a process that uses a same lock as the first process.

11. A terminal device, wherein the terminal device comprises a processor and a memory, and the memory stores computer-executable instructions; and the processor executes the computer-executable instructions stored in the memory, and when the terminal device executes the computer instructions, the terminal device performs the following operations:

identifying, by the terminal device, an unfolding event when the terminal device is in a folded state and an outer display screen of the terminal device is off, wherein the unfolding event is used to indicate the terminal device to switch from the folded state to an unfolded state;

obtaining, by the terminal device when identifying the unfolding event, identification information of a first process, wherein the first process is a process that is in the terminal device and that is related to display of an inner display screen of the terminal device;

adjusting, by the terminal device, a scheduling priority of the first process from a first priority to a second priority based on the identification information of the first process, wherein the second priority is higher than the first priority, and wherein the scheduling priority determines an order in which a processor of the terminal device schedules processes for execution;

scheduling, by the terminal device based on the second priority, the first process for running; and lighting up, by the terminal device after running of the first process is completed, the inner display screen, and displaying an interface on the inner display screen.

12. The terminal device according to claim 11, wherein the obtaining, by the terminal device when identifying the unfolding event, identification information of a first process, and when the terminal device executes the computer instructions, the terminal device performs the following operations:

obtaining, by the terminal device, the identification information of the first process when invoking the first process.

13. The terminal device according to claim 11, wherein the obtaining when identifying the unfolding event, by the terminal device, identification information of a first process, and when the terminal device executes the computer instructions, the terminal device performs the following operations:

reading, by the terminal device when identifying the unfolding event, the identification information of the first process from a local cache;

before the identifying, by the terminal device, an unfolding event when the terminal device is in a screen-off folded state, and when the terminal device executes the computer instructions, the terminal device performs the following operations:

writing, by the terminal device, the identification information of the first process into a database when the first process is started; and storing, by the terminal device, the identification information of the first process in the local cache when the terminal device detects that the identification information of the first process is written into the database.

14. The terminal device according to claim 11, wherein when the terminal device executes the computer instructions, the terminal device performs the following operations:

The first process comprises a system interface process, and the system interface process is used to draw the interface.

15. The terminal device according to claim 11, wherein when the terminal device executes the computer instructions, the terminal device performs the following operations:

adjusting, by the terminal device after the running of the first process is completed, the first process from the second priority to the first priority.

16. The terminal device according to claim 15, wherein the first process is a system interface process; and the adjusting, by the terminal device, the first process from the second priority to the first priority, and when the terminal device executes the computer instructions, the terminal device performs the following operations:

adjusting, by the terminal device, the first process from the second priority to the first priority when the first process completes drawing of the interface.

17. The terminal device according to claim 11, wherein when the terminal device executes the computer instructions, the terminal device performs the following operations:

adjusting the first process from the second priority to the first priority upon expiration of a preset time interval after the first process is adjusted from the first priority to the second priority.

18. The terminal device according to claim 11, wherein when the terminal device executes the computer instructions, the terminal device performs the following operations:

adjusting, by the terminal device, the first process from the second priority to the first priority when the inner display screen is lighted up.

19. The terminal device according to claim 11, wherein when the terminal device executes the computer instructions, the terminal device performs the following operations:

invoking, by the first process after the first process is adjusted from the first priority to the second priority, a second process; and adjusting, by the terminal device, the second process from a third priority to the second priority, wherein the second process is a process invoked in response to the first process; and adjusting, by the terminal device, a third process from a fourth priority to the second priority, wherein the third process has a dependency relationship with the first process; and deleting, by the terminal device, a lock in a fourth process, wherein the fourth process is the first process, and/or a process that uses a same lock as the first process.

20. A non-transitory computer-readable storage medium, wherein the non-transitory computer-readable storage medium stores a computer program, and when the computer program is run on a terminal device, the terminal device performs the following operations:

identifying, by the terminal device, an unfolding event when the terminal device is in a folded state and a outer display screen of the terminal device is off, wherein the unfolding event is used to indicate the terminal device to switch from the folded state to an unfolded state;

obtaining, by the terminal device when identifying the unfolding event, identification information of a first process, wherein the first process is a process that is in the terminal device and that is related to display of an inner display screen of the terminal device;

adjusting, by the terminal device, a scheduling priority of the first process from a first priority to a second priority based on the identification information of the first process, wherein the second priority is higher than the first priority, and wherein the scheduling priority determines an order in which a processor of the terminal device schedules processes for execution:

scheduling, by the terminal device based on the second priority, the first process for running; and lighting up, by the terminal device after running of the first process is completed, the inner display screen, and displaying an interface on the inner display screen.

\* \* \* \* \*